(12) United States Patent
Chang et al.

(10) Patent No.: US 9,880,392 B2
(45) Date of Patent: Jan. 30, 2018

(54) CAMERA ARRAY APPARATUS

(71) Applicant: Industrial Technology Research Institute, Hsinchu (TW)

(72) Inventors: Kao-Der Chang, Taichung (TW); Luan-Ying Chen, Changhua County (TW); Ching-I Tai, Tainan (TW); Jui-Wen Pan, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 120 days.

(21) Appl. No.: 14/985,404

(22) Filed: Dec. 31, 2015

(65) Prior Publication Data

US 2017/0153459 A1 Jun. 1, 2017

(30) Foreign Application Priority Data

Nov. 30, 2015 (TW) .............................. 104139930 A

(51) Int. Cl.
| | |
|---|---|
| *G02B 27/10* | (2006.01) |
| *G02B 13/00* | (2006.01) |
| *H04N 5/225* | (2006.01) |
| *H04N 5/247* | (2006.01) |
| *G02B 5/04* | (2006.01) |

(Continued)

(52) U.S. Cl.
CPC ......... *G02B 27/1066* (2013.01); *G02B 5/045* (2013.01); *G02B 13/0085* (2013.01); *G02B 27/126* (2013.01); *H04N 5/2258* (2013.01); *H04N 5/247* (2013.01); *H04N 5/23238* (2013.01)

(58) Field of Classification Search
None
See application file for complete search history.

(56) References Cited

U.S. PATENT DOCUMENTS

2003/0128359 A1* 7/2003 Sanpei .................. G01J 3/2803
356/326
2007/0236595 A1 10/2007 Pan et al.
(Continued)

FOREIGN PATENT DOCUMENTS

| CN | 103076709 | 5/2013 |
|---|---|---|
| TW | 200740212 | 10/2007 |
| TW | 201516515 | 5/2015 |

OTHER PUBLICATIONS

Dannberg et al., "Wafer-Level Hybrid Integration of Complex Micro-Optical Modules", Micromachines, Jun. 5, 2014, pp. 325-340.
(Continued)

*Primary Examiner* — Frederick Bailey
(74) *Attorney, Agent, or Firm* — JCIPRNET

(57) ABSTRACT

A camera array apparatus including a plurality of cameras and a light deflection module is provided. The cameras are arranged in an array. The light deflection module is disposed on the cameras. The light deflection module includes at least one prism set. The prism set has a plurality of prisms. The prism set is configured to deflect a light entering obliquely with respect to an optical axis of the cameras to at least a portion of the cameras. The angle between the optical axis and the deflected light is smaller than the angle between the optical axis and the light before being deflected.

18 Claims, 21 Drawing Sheets

(51) Int. Cl.
*G02B 27/12* (2006.01)
*H04N 5/232* (2006.01)

(56) References Cited

U.S. PATENT DOCUMENTS

| | | | |
|---|---|---|---|
| 2009/0003001 A1* | 1/2009 | Ohta | G02B 5/045 362/339 |
| 2010/0194968 A1* | 8/2010 | Inomoto | G02B 27/108 348/345 |
| 2010/0290128 A1* | 11/2010 | Sugitatsu | G02B 27/145 359/634 |
| 2012/0188391 A1 | 7/2012 | Smith | |
| 2013/0088637 A1 | 4/2013 | Duparre | |
| 2013/0222931 A1* | 8/2013 | Zhang | G02B 5/0231 359/837 |
| 2015/0116527 A1 | 4/2015 | Rossi | |
| 2015/0146029 A1* | 5/2015 | Venkataraman | H04N 5/23232 348/218.1 |
| 2015/0156478 A1* | 6/2015 | Ono | H04N 5/2251 348/49 |
| 2016/0234411 A1* | 8/2016 | Yin | G02B 13/0085 |
| 2017/0123183 A1* | 5/2017 | Lin | G02B 13/004 |

OTHER PUBLICATIONS

Logean et al., "Field curvature correction in multichannel miniature imaging systems suited for wafer-level production", Optical Engineering, Jul., 2013, pp. 075101-1-075101-6.

Liang et al., "Wide-angle and ultrathin camera module using a curved hexagonal microlens array and all spherical surfaces", Applied Optics, Aug. 21, 2014, pp. H121-H128.

Li et al., "Design and fabrication of a freeform microlens array for a compact large-field-of-view compound-eye camera", Applied Optics, Apr. 11, 2012, pp. 1843-1852.

Venkataraman et al., "PiCam: An Ultra-Thin High Performance Monolithic Camera Array", ACM Transactions on Graphics, Nov. 2013, pp. 166:1-166:13.

Liang et al., "Wide-angle camera with multichannel architecture using microlenses on a curved surface", Applied Optics, Jun. 5, 2014, pp. 3696-3705.

* cited by examiner

CAMERA ARRAY APPARATUS

CROSS-REFERENCE TO RELATED APPLICATION

This application claims the priority benefit of Taiwan application serial no. 104139930, filed on Nov. 30, 2015. The entirety of the above-mentioned patent application is hereby incorporated by reference herein and made a part of this specification.

TECHNICAL FIELD

The Technical Field Relates to a Camera Array Apparatus.

BACKGROUND

Image sensors have become an indispensable part of daily life and are widely applied to, for example, mobile phone camera modules, computer network cameras, digital cameras, driving recorders, driveway recognition cameras, security and surveillance systems, and so on. Additionally, developments with respect to the image sensors in new markets for the future further includes fields related to, for example, health care, wearable devices, virtual reality or augmented reality.

In order to meet demands, such as miniaturization, thinning and cost reduction for the image sensors, a wafer level optics (WLO) technique has been developed. At present, a camera module industry chain is generally divided into lenses, voice coil motors (VCM), CMOS sensors and cameras modules. In contrast, in the WLO technique, currently available camera modules are manufactured and produced in a WLO process. With the semiconductor technique, a great amount of lenses can be simultaneously manufactured on one wafer, such that the overall manufacturing cost can be reduced. Generally, cameras of the camera modules manufactured by the WLO technique are massively produced, manufactured, and assembled in an array concept. However, since the camera array modules manufactured by utilizing the WLO technique seek for thinning design, such that corresponding focal lengths become shortened, and as a result, an overall field angles become smaller. Therefore, how to increase the field angle of WOL cameras has currently become a research target for researchers in this field.

SUMMARY

A camera array apparatus including a plurality of cameras and a light deflection module is introduced herein. The cameras are arranged in an array. The light deflection module is disposed on the cameras. The light deflection module includes at least one prism set having a plurality of prisms which are configured to deflect a light entering obliquely with respect to an optical axis of the cameras to at least a portion of the cameras. An included angle of the deflected light with respect to the optical axis is smaller than an included angle of the light before being deflected with respect to the optical axis.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
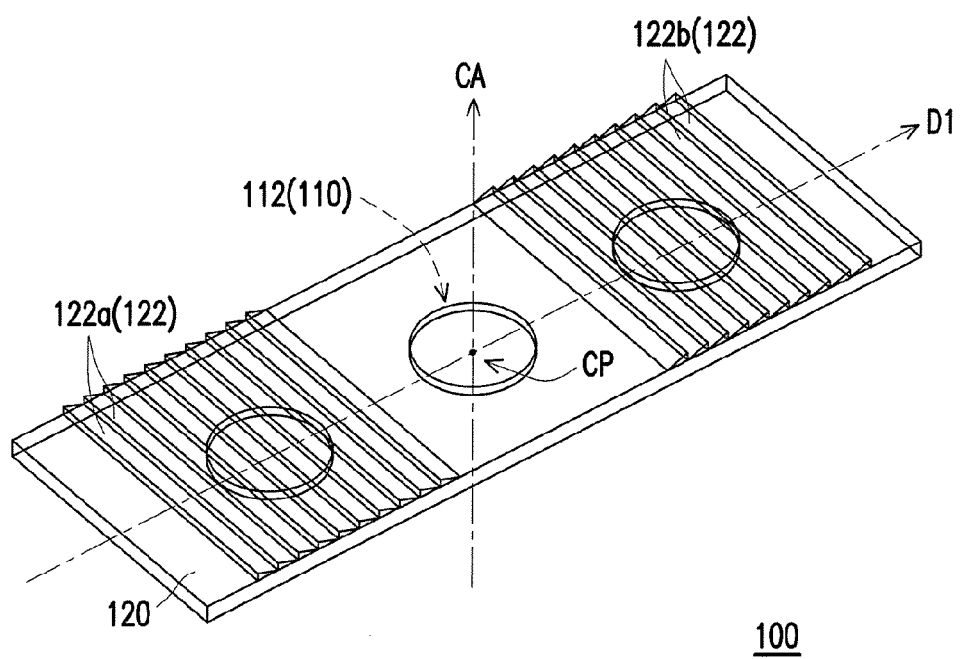
FIG. 1A is a schematic top-view diagram illustrating a camera array apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
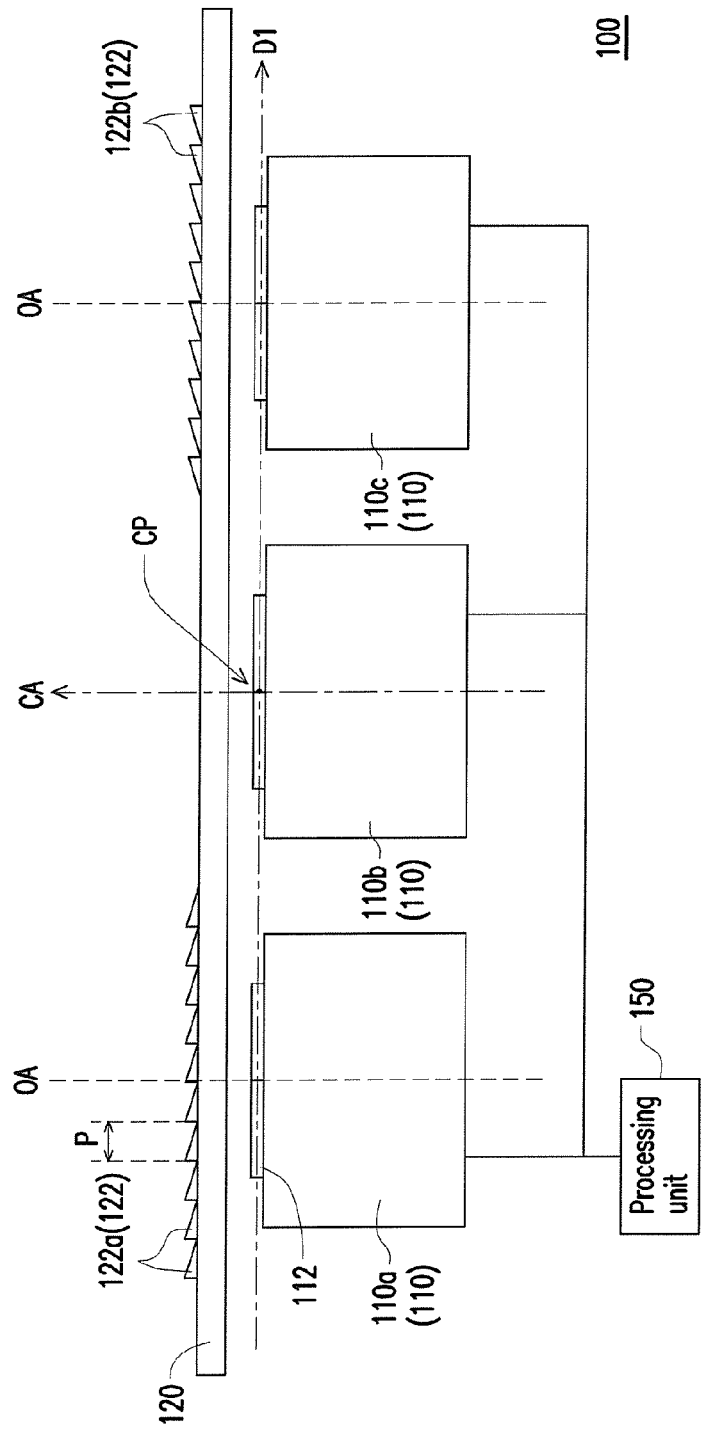
FIG. 1B is a schematic side-view diagram of the camera array apparatus of the embodiment illustrated in FIG. 1A.

FIG. 1A is a schematic top-view diagram illustrating a camera array apparatus according to an embodiment of the disclosure. FIG. 1B is a schematic side-view diagram of the camera array apparatus of the embodiment illustrated in FIG. 1A. Referring to FIG. 1A and FIG. 1B. In the present embodiment, a plurality of apertures 112 of a plurality of cameras 110 are illustrated in FIG. 1A, while other parts of the cameras 110 are not shown. A position of each camera 110 is corresponding to a position of an aperture 112. In the present embodiment, the camera array apparatus 100 includes a plurality of cameras 110, and the cameras 110 are arranged in an array. To be specific, the array in which the cameras 110 are arranged is a one-dimensional array. The cameras 110 include cameras 110a, 110b and 110c, and the cameras 110a, 110b and 110c are arranged in a row in sequence along an extending direction of the first axis D1. In some embodiments, the camera array apparatus 100 may include any other number of cameras 110, and the cameras 110 may be arranged in a two-dimensional array or an arbitrary arrangement. The number and the arrangement of the cameras are not particularly limited in the disclosure. Additionally, the cameras 100 (including the cameras 100a, 100b and 100c) of the present embodiment may be wafer level cameras (WLCs), for example, while in other embodiments, the cameras may also be other types of cameras, which construe no limitations to the disclosure.

Figure 1C:
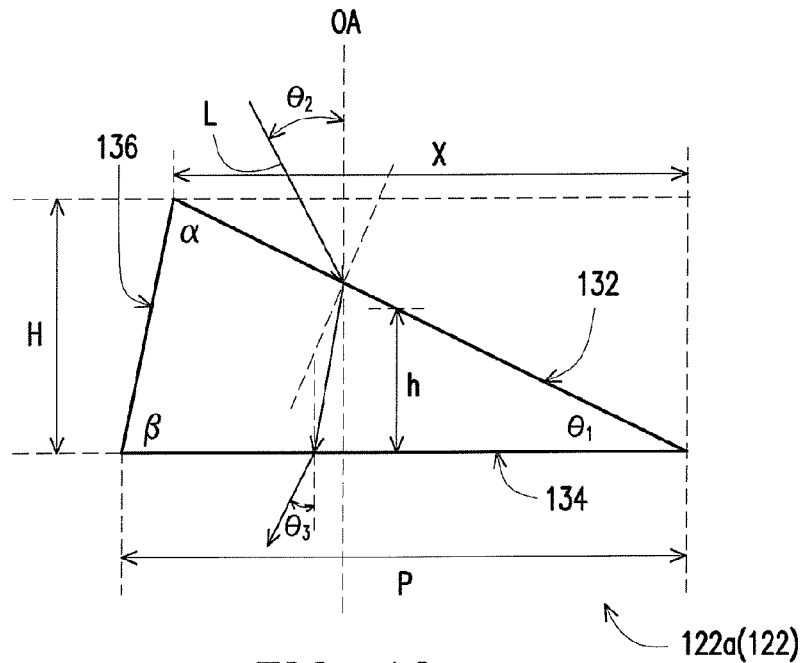
FIG. 1C schematically illustrates an obliquely incident light entering prisms of the embodiment illustrated in FIG. 1A according to an embodiment of the disclosure.
Figure 1D:
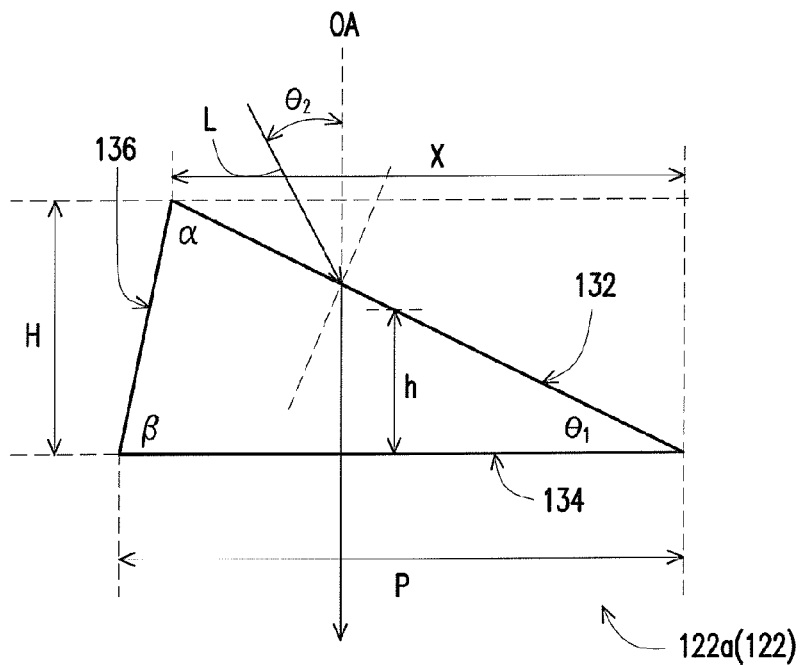
FIG. 1D schematically illustrates the obliquely incident light entering the prisms of the embodiment illustrated in FIG. 1A and vertically exiting therefrom according to an embodiment of the disclosure.

FIG. 1C schematically illustrates an obliquely incident light entering the prisms of the embodiment illustrated in FIG. 1A according to an embodiment of the disclosure. FIG. 1D schematically illustrates the obliquely incident light entering the prisms of the embodiment illustrated in FIG. 1A and vertically exiting therefrom according to an embodiment of the disclosure. Referring to FIG. 1A through FIG. 1D together, in the present embodiment, the camera array apparatus 100 includes a light deflection module 120, and the light deflection module 120 is disposed on the cameras 110 (including the cameras 110a, 110b and 110c). The light deflection module 120 includes at least one prism set 122 having a plurality of prisms which are configured to deflect a light L (e.g., a light L illustrated in FIG. 1C and FIG. 1D) entering obliquely with respect to an optical axis OA of the cameras 110a, 110b and 110c to the apertures 112 of at least a portion of the cameras 110. To be specific, the prism set 122 includes a plurality of first prisms 122a and a plurality of second prisms 122b. The first prisms 122a and the second prisms 122b are disposed on a transparent plate, the first prisms 122a cover the camera 110a, and the second prisms 122b cover the camera 110c. In addition, no prisms cover a position on the transparent plate corresponding to the camera 110b. In some embodiments, the prism set 122 selectively covers part of the cameras 110 based on an optical design of the camera array apparatus 100, but the disclosure is not limited thereto. Additionally, the prism set 122 (including the first prisms 122a and the second prisms 122b) may be made of a transparent material with a refractive index falling within a range from 1.4 to 1.7 or other refractive indexes, which is also not limited in the disclosure.

Referring to FIG. 1B, in the present embodiment, the prism set 122 (including the first prisms 122a and the second prisms 122b) of the light deflection module 120 is periodically arranged. The first prisms 122a and the second prisms 122b have the same arrangement period P, and the arrangement period P is more than 50 times a wavelength value corresponding to a spectral peak of the light L, and the arrangement period P is less than 1 mm. In some embodiments, the light L may be, for example, a visible light with a wavelength ranging from 380 nm to 780 nm, while in some other embodiments, the light L may also be, for example, a near-infrared light with a wavelength around 3000 nm, which is not limited in the disclosure. To be specific, the arrangement period P of the prisms of the prism set 122 of the present embodiment is more than 27.5 μm, and less than 1 mm, for example, 200 μm.

Referring to FIG. 1B, FIG. 1C and FIG. 1D, in the present embodiment, each of the first prisms 122a and second prisms 122b in the prism set 122 has a light-entering surface 132, a light-exiting surface 134 and side surface 136 connected together. To be specific, the light-exiting surface 134 faces the apertures 112 of the cameras 110, and the light-exiting surface 134 is perpendicular to the optical axis OA of the cameras 110. The light L enters the prism set 122 through the light-entering surfaces 132 of the prism set 122, exits the prism set 122 through the light-exiting surfaces 134 of the prism set 122 and enters at least part of the apertures 112 of the cameras 110. To be specific, the light L passing through the first prisms 122a enters the camera 110a, and the light L passing through the second prisms 122b enters the camera 110c.

In the present embodiment, the one-dimensional array formed by the cameras 110 arranged in the extending direction of the first axis D1 has a center point CP. To be specific, the center point CP is located on the camera 110b. Each light-entering surface 132 of the prism set 122 obliquely faces the center point CP of the one-dimensional array. In the present embodiment, a central axis CA passes through the center point CP of the one-dimensional array and is perpendicular to an arrangement direction of the one-dimensional array. Namely, the central axis CA passes through the center point CP and is perpendicular to a first axis D1. The prisms located at two sides of the central axis CA are line-symmetric to each other with respect to the central axis CA. To be specific, the first prisms 122a and the second prisms 122b are respectively disposed at two different sides of the central axis CA, and the light-entering surfaces 132 of the first prisms 122a and the second prisms 122b obliquely face the center point CP. Additionally, the central axis CA serves as a symmetry axis for the line symmetry, and the first prisms 122a and the second prisms 122b are line-symmetric (or mirror-symmetric). In some embodiments, the number of the first prisms 122a may be not the same as the number of the second prisms 122b, and the first prisms 122a and the second prisms 122b may not be line-symmetric to each other with respect to the central axis CA. On the other hand, in some other embodiments, the first prisms 122a and the second prisms 122b may have different shapes and arrangement periods, but the disclosure is not limited thereto.

Continuously referring to FIG. 1C and FIG. 1D, in the present embodiment, an included angle between each light-entering surface 132 and each light-exiting surface 134 of the prism set 122 is θ₁, an included angle between each light-entering surface 132 and each side surface 136 is a, and an included angle between each light-exiting surface 134 and each side surface 136 is β. To be specific, when the light L obliquely enters the prism set 122 through the light-entering surfaces 132 in an included angle θ₂ with respect to the optical axis OA, the light L is deflected after entering the prism set 122 due to the prism set 122 having a refractive index greater than the air. Then, the light L entering the prism set 122 exits the prism set 122 through the light-exiting surfaces 134 and is deflected again after exiting the prism set 122. The light L exiting the prism set 122 through the light-exiting surface 134 has an included angle θ₃ with respect to the optical axis OA. In the present embodiment, according to the Snell's Law, the included angle θ₁, the included angle θ₂, the included angle θ₃ and the refractive index n of the prism set 122 meet the following equation:

$$\tan\theta_1 = \frac{\sin\theta_2 + n\sin(\arcsin(\sin\theta_3))}{n\cos(\arcsin(\sin\theta_3)) - \cos\theta_2}$$

In the present embodiment, the included angle β serves as a draft angle of the prism set 122. In order for the light L with a great angel entering the apertures 112 of the cameras 110 through the light deflection module 120 to achieve the largest effective area, the included angle β may be as approximate to 90 degrees as possible. Additionally, the cameras 110 of the present embodiment are wafer level cameras, and each camera 110 has a small field angle. Thus, the included angle θ₃ between the light L that may be received by the aperture 112 of each camera 110 and the optical axis OA is not allowed to be too large. To be specific, the aperture 112 of each camera 110 may receive at least the light L whose included angle θ₃ is 0. In other words, the aperture 112 of each camera 110 may receive at least the light L parallel to the optical axis OA, for example, the light L illustrated in FIG. 1D. In the present embodiment, in order to simplify the equation of the included angle θ₁, the included angle θ₂, the included angle θ₃ and the refractive index n of the prism set 122, the included angle θ₃ is limited to 0 degree, and the included angle β is limited to 90 degrees. The equation of the included angle θ₁, the included angle θ₂, the included angle θ₃ and the refractive index n of the prism set 122 may be approximate simplified as follows:

$$\tan\theta_1 = \frac{\sin\theta_2}{n - \cos\theta_2}$$

In the present embodiment, an included angle of the light L deflected by the prism set 122 with respect to the optical axis OA is smaller than an included angle of the light L before being deflected with respect to the optical axis OA. To be specific, when each light-entering surface 132 and each light-exiting surface 134 of the prism set 122 have the included angle θ₁, the aperture 112 of each camera 110 may at least receive the light L having the included angel θ₂ with respect to the optical axis OA and obliquely entering the prism set 122. In comparison with one of the cameras 110 (e.g., the camera 110b illustrated in FIG. 1B) having no prism set 122, the aperture 112 of the cameras 110 (e.g., the camera 110a or 110c illustrated in FIG. 1B) with the prism set 122 may at least receive the light L having the included angle θ₂ with respect to the optical axis OA and obliquely entering the prism set 122. In particular, the included angle β of the prism set 122 may fall within a range from 88 degrees to 90 degrees. In other embodiments, the included angle β may be designed to have other degrees based on other optical designs, but the disclosure is not limited thereto.

Figure 2A:
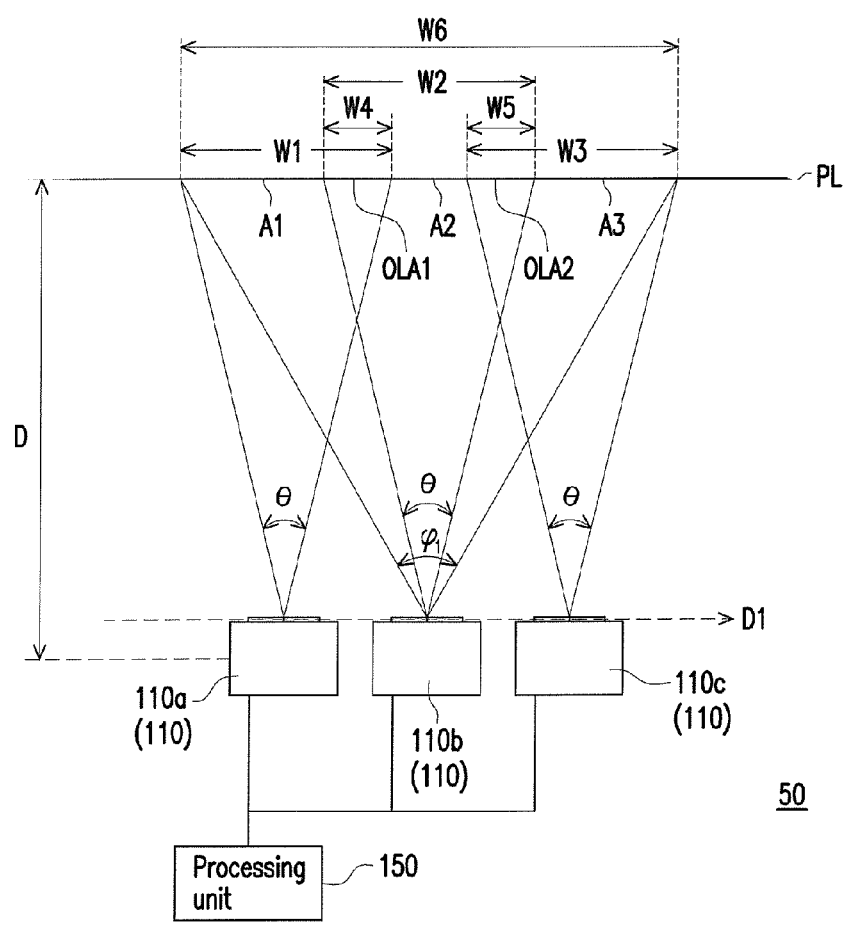
FIG. 2A is a schematic diagram illustrating a field angle of a camera array apparatus of a comparison embodiment.

FIG. 2A is a schematic diagram illustrating a field angle of a camera array apparatus of a comparison embodiment. Referring to FIG. 2A, in the present comparison embodiment, a camera array apparatus 50 includes a plurality of cameras 110 (including cameras 110a, 110b and 110c). The cameras 110a, 110b and 110c are arranged sequentially in a row along the extending direction of the first axis D1. The camera array apparatus 50 captures a portion on a plane PL separating from the cameras 110 in a distance D. To be specific, the plane PL is parallel to the first axis D1. The cameras 110 (including the cameras 110a, 110b and 110c) have the field angle with the same angle θ. In the present comparison embodiment, the camera 110a captures an area A1 on the plane PL, and the area A1 has a width W1. The camera 110b captures an area A2 on the plane PL, and the area A2 has a width W2. The camera 110c captures an area A3 on the plane PL, and the area A3 has a width W3. To be specific, both the area A1 and the area A2 have a same overlapping area OLA1, and the overlapping area OLA1 have a width W4. Both the area A2 and the area A3 have a same overlapping area OLA2, and the overlapping area OLA2 has a width W5.

In the present comparison embodiment, the camera array apparatus 50 further includes a processing unit 150 configured to stitch a plurality of images captured by the cameras 110 (including the cameras 110a, 110b and 110c) to form a stitched image. To be specific, an image stitching method for the processing unit 150 is, for example, deleting the repeated overlapping area OLA1 of the area A1 and the area A2 of the images, so as to stitch the area A1 containing the overlapping area OLA1 in the image with the area A2 whose overlapping area OLA1 is deleted. Additionally, the processing unit 150 deletes the repeated overlapping area OLA2 of the area A2 and the area A3 of the images, so as to stitch the area A2 containing the overlapping area OLA2 in the image with the area A3 whose overlapping area OLA2 is deleted. After the processing unit 150 performs the image stitching on the plurality of images captured by the cameras 110, the images of the area A1, the area A2 and the area A3 in the stitched image are successive. An area corresponding to the stitched image on the plane PL has a width W6.

In the present comparison embodiment, the cameras 110 of the camera array apparatus 50 respectively obtain a plurality of images of the areas A1, A2 and A3, and the area on the plane PL corresponding to the stitched image obtained by the images processed through the image stitching process has the width W6. Thus, the camera array apparatus 50 equivalently has a field angle of φ₁.

Figure 2B:
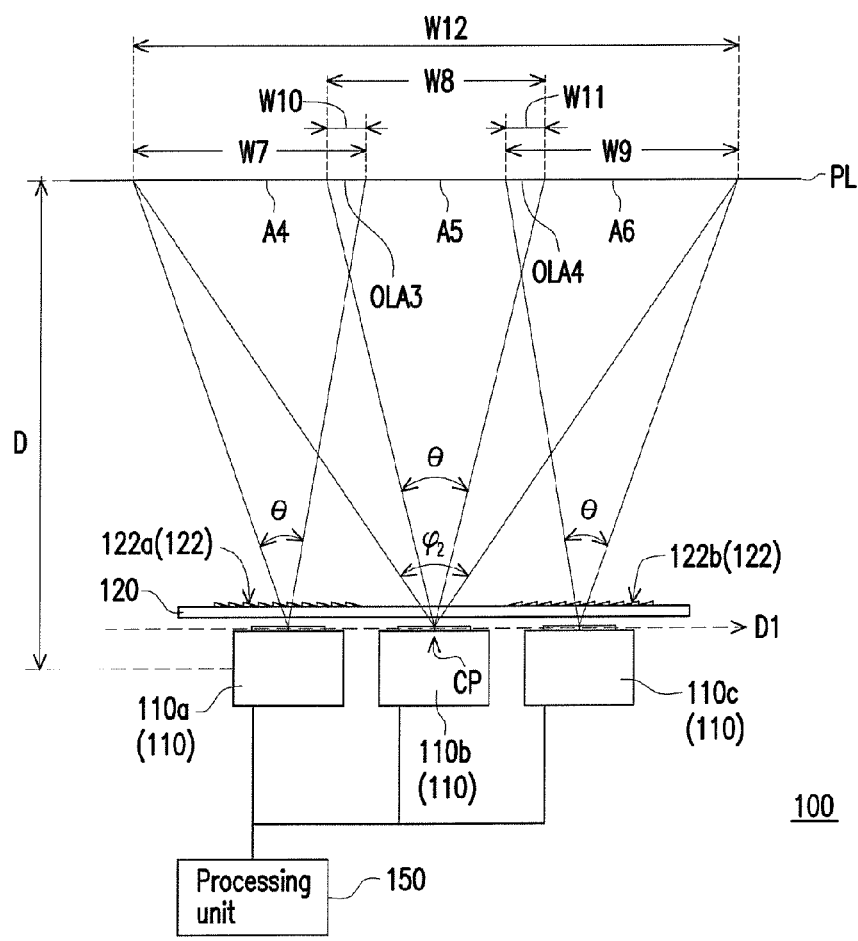
FIG. 2B is a schematic diagram illustrating a field angle of the camera array apparatus of the embodiment illustrated in FIG. 1A.

FIG. 2B is a schematic diagram illustrating a field angle of the camera array apparatus of the embodiment illustrated in FIG. 1A. Referring to FIG. 2B together with FIG. 2A comparatively, in the present embodiment, the camera array apparatus 100 may also capture part of the areas on the plane PL with a distance D from the cameras 110 of the camera array apparatus 100. To be specific, the plane PL is parallel to the first axis D1. Each of the cameras 110 (including the cameras 110a, 110b and 110c) has a field angle of the same angle θ. In the present embodiment, the light deflection module 120 is disposed on the cameras 110, and the aperture 112 of the camera 110a at least receives the light L having an included angle (e.g., the included angle $\theta_2$) with respect to the optical axis OA and obliquely entering the first prisms 122a since the first prisms 122a cover the camera 110a, and the light-entering surfaces 132 of the first prisms 122a obliquely face the center point CP. To be specific, the light L is oblique from the light-entering surfaces 132 of the first prisms 122a toward side surface 136 and thus, has the included angle $\theta_2$ with respect to the optical axis OA. Additionally, since the second prisms 122b cover the camera 110c, and the light-entering surfaces 132 of the second prisms 122b obliquely face the center point CP, the apertures 112 of the camera 110c at least receive the light having an included angle (e.g., the included angle $\theta_2$) with respect to the optical axis OA and obliquely entering the prism set 122. To be specific, the light is oblique from the light-entering surfaces 132 of the second prisms 122b toward the side surface 136 and thus, has the included angle $\theta_2$ with respect to the optical axis OA. In the present embodiment, the camera 110a captures an area A4 on the plane PL, and the area A4 has a width W7. The camera 110b captures an area A5 on the plane PL, and the area A5 has a width W8. The camera 110c captures an area A6 on the plane PL, and the area A6 has a width W9. To be specific, both the areas A4 and A5 have the same overlapping area OLA3, and the overlapping area OLA3 has a width W10. Both the areas A5 and A6 have the same overlapping area OLA4, and the overlapping area OLA4 has a width W11.

In the present embodiment, the camera array apparatus 100 further includes a processing unit 150 configured to stitch a plurality of images captured by the cameras 110 (including the cameras 110a, 110b and 110c) to form a stitched image. To be specific, an image stitching method for the processing unit 150 of the camera array apparatus 100 is similar to the image stitching method for the processing unit 150 of the comparison embodiment illustrated in FIG. 2A and thus, will not be repeatedly described. After the processing unit 150 performed the image stitching on the plurality of images captured by the cameras 110 of the camera array apparatus 100, a stitched image of the camera array apparatus 100 includes the images of the areas A4, A5 and A6, and the images of the areas A4, A5 and A6 are successive. An area on the plane PL corresponding to the stitched image of the camera array apparatus 100 has a width W12.

Referring to FIG. 2B together with FIG. 2A comparatively, in the present embodiment, the aperture 112 of the camera 110a at least receives the light L having an included angle (e.g., the included angle $\theta_2$) with respect to the optical axis OA and obliquely entering the first prisms 122a, and thus, in comparison with the area A1 captured by the camera 110a of the camera array apparatus 50, the area A4 captured by the camera 110a of the camera array apparatus 100 shifts along a direction of the light-entering surfaces 132 of the first prisms 122a to the side surface 136. Additionally, the aperture 112 of the camera 110c at least receives the light L having an included angle (e.g., the included angle $\theta_2$) with respect to the optical axis OA and obliquely entering the second prisms 122b, and thus, in comparison with the area A3 captured by the camera 110c of the camera array apparatus 50, the area A6 captured by the camera 110c of the camera array apparatus 100 shifts along a direction of the light-entering surfaces 132 of the second prisms 122b to the side surface 136. In the present embodiment, the images captured by the cameras of the camera array apparatus 100 have smaller overlapping areas. To be specific, the width W10 of the overlapping area OLA3 is smaller than the width W4 of the overlapping area OLA1, and the width W11 of the overlapping area OLA4 is smaller than the width W5 of the overlapping area OLA2. In the present embodiment, the width W12 is greater than the width W6 of the area on the plane PL corresponding to the stitched image of the camera array apparatus 50 of the comparison embodiment illustrated in FIG. 2A. To be specific, the camera array apparatus 100 has the field angle $\varphi_2$ greater than the field angle $\varphi_1$ of the camera array apparatus 50. The field angle $\varphi_2$ of the camera array apparatus 100 is, for example, a sum of the angle $\varphi_1$ and two included angles $\theta_2$. Additionally, in other embodiments, it may be a scenario that no overlapping areas between the images captured by the plurality of cameras 110 of the camera array apparatus 100, and the disclosure is not limited thereto.

In the present embodiment, the light deflection module 120 of the camera array apparatus 100 includes at least one prism set 122 having a plurality of first prisms 122a and a plurality of second prisms 122b. The first prisms 122a are configured to deflect the light L entering obliquely with respect to the optical axis OA of the camera 110a to the camera 110a, and the second prisms 122b are configured to deflect the light L entering obliquely with respect to the optical axis OA of the camera 110c to the camera 110c. An included angle of the deflected light L with respect to the optical axis OA is smaller than included angle $\theta_2$ of the light before being deflected L with respect to the optical axis OA. Thus, the images captured by the cameras 110 (including the cameras 110a, 110b and 110c) of the camera array apparatus 100 have fewer overlapping area therebetween to form the stitched image having a greater field angle through the image stitching process, such that the camera array apparatus 100 achieves a wide viewing angle effect.

Figure 3A:
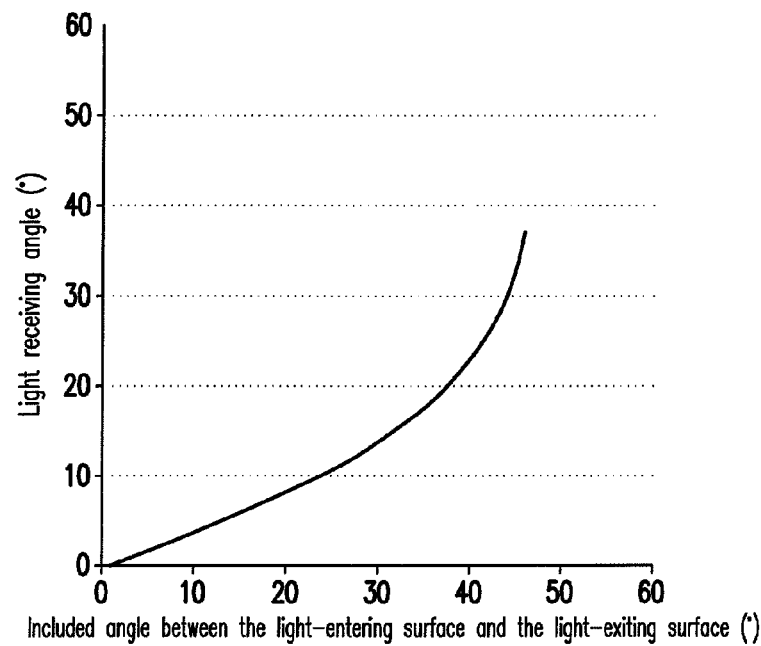
FIG. 3A through FIG. 3C are diagrams illustrating light receiving angles of the prisms having different refractive indexes with respect to the included angle between each light-entering surface and each light-exiting surface.
Figure 3B:
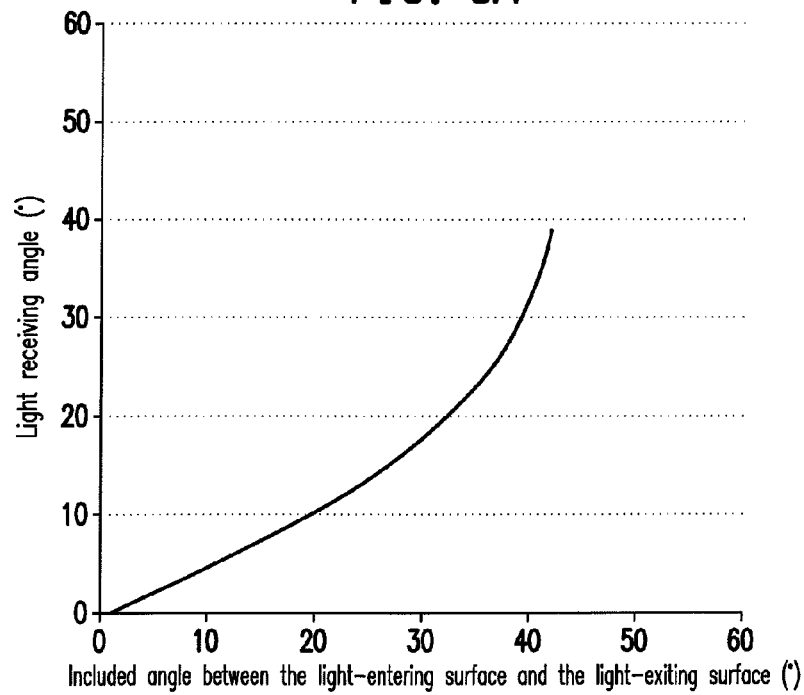
Figure 3C:
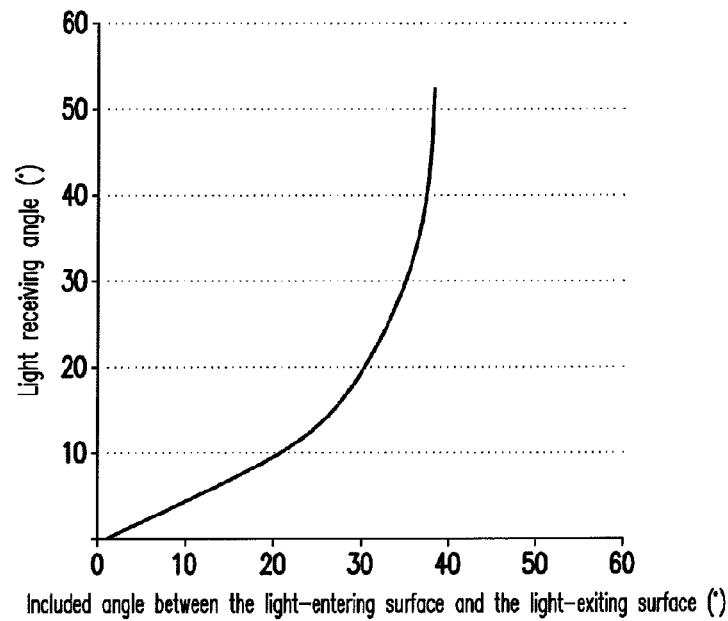

FIG. 3A through FIG. 3C are diagrams illustrating light receiving angles of the prisms having different refractive indexes with respect to the included angle between each light-entering surface and each light-exiting surface. Referring to FIG. 3A through FIG. 3C, in the present embodiment, FIG. 3A, FIG. 3B and FIG. 3C respectively illustrate diagrams of light receiving angles of the prism set 122 with respect to the included angle between each light-entering surface 132 and each light-exiting surface 134 of the prism set 122 when the refractive indexes of the prism set 122 are 1.4, 1.5 and 1.7, respectively. All the horizontal axes of FIG. 3A, FIG. 3B and FIG. 3C are labeled as "Included angle between the light-entering surface and the light-exiting surface" which is corresponding to the included angle $\theta_1$ described in the embodiments illustrated in FIG. 1C and FIG. 1D, and the unit thereof is degree (°). All the vertical axes of FIG. 3A, FIG. 3B and FIG. 3C are labeled as "Light receiving angle" which is corresponding to the included angle $\theta_2$ described in the embodiments illustrated in FIG. 1C and FIG. 1D, and the unit thereof is degree (°). In the present embodiment, comparing a scenario that the refractive index of the prism set 122 is 1.4 with a scenario that the refractive index is 1.7, the greater refractive index of the prism set 122 results in the greater light receiving angle $\theta_2$ as the included angle $\theta_1$ between the light-entering surface and the light-exiting surface is the same.

Figure 3D:
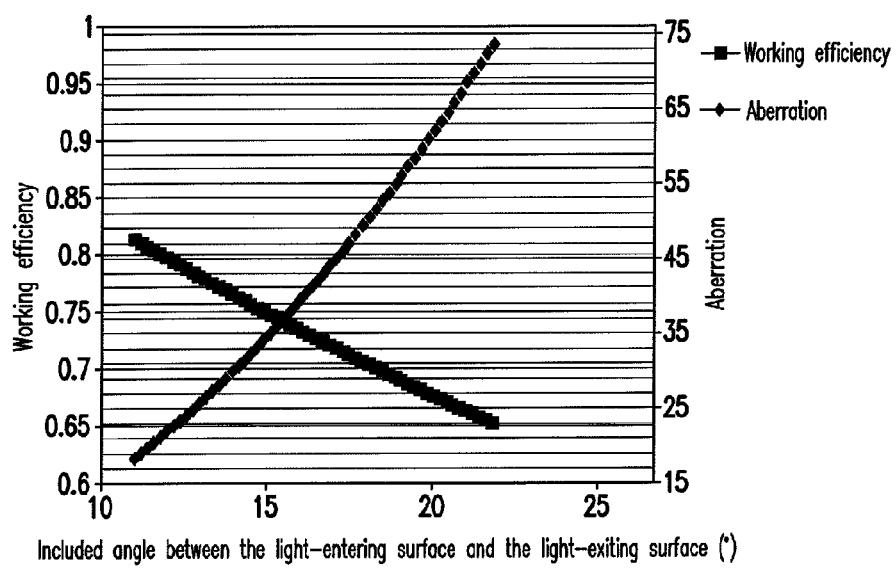
FIG. 3D is a diagram illustrating a working efficiency and an aberration of the prisms respectively with respect to the included angle between each light-entering surface and each light-exiting surface.

FIG. 3D is a diagram illustrating a working efficiency and an aberration of the prisms respectively with respect to the included angle between each light-entering surface and each light-exiting surface. Referring to FIG. 3D together with FIG. 1C and FIG. 1D, in the present embodiment, FIG. 3D illustrates not only a diagram of the working efficiency of the prism set 122 with respect to the included angle between each light-entering surface 132 and each light-exiting surface 134 of the prism set 122, but also a diagram of an aberration of the prism set 122 with respect to the included angle between each light-entering surface 132 and each light-exiting surface 134 of the prism set 122. The horizontal axis of FIG. 3D is labeled as "Included angle between the light-entering surface and the light-exiting surface" which is corresponding to the included angle $\theta_1$ of the embodiments illustrated in FIG. 1C and FIG. 1D, and the unit thereof is degree (°). One of the vertical axes of FIG. 3D is labeled as "Working efficiency" which is corresponding to the working efficiency of the prism set 122 and has no unit. The other vertical axis of FIG. 3D is labeled as "Aberration" which is corresponding to an aberration of the prism set 122 and has no unit. In the present embodiment, a vertical distance from an intersection of the light-entering surface 132 and the side surface 136 of the prism set 122 to the light-exiting surface 134 is a height H of the prism set 122. The height H of the prism set 122, the arrangement period P of the prisms 122, the included angle α, the included angle β and the included angle $\theta_1$ meet the following equation:

$$H = \frac{P}{\left[\sin^{-2}\beta + \sin^{-2}\theta_1 - \frac{\cos\alpha}{(\sin\beta \times \sin\theta_1)}\right]}$$

In the present embodiment, a projection length of the light-entering surface 132 of the prism set 122 on the light-exiting surface 134 is a length X. To be specific, the working efficiency of the prism set 122 is equal to the length X divided by the arrangement period P. Additionally, an aberration A of the prism set 122, the refractive index of the prism set 122 and the included angle $\theta_1$ meet the following equation:

$$A = \frac{Kh\theta_1^2(n-1)}{n^3}$$

Therein, K represents a relation constant, n represents the refractive index of the prism set 122, and h represents the vertical distance from the light-entering surface 132 corresponding to the center of the light-exiting surface 134 of the prism set 122 to the light-exiting surface 134. In the present embodiment, through the adjustment of the included angle $\theta_1$ of the prism set 122 corresponding to the required receiving included angle $\theta_2$, as well as adaptive adjustment of the included angle $\theta_1$ and the arrangement period P, the working efficiency and the aberration the prism set 122 may be controlled within an appropriate range.

The diagrams of the light receiving angle of the prism set with respect to the included angle between the light-entering surface and the light-exiting surface as illustrated in the FIG. 3A through FIG. 3C, and the diagram of the prism set working efficiency and the aberration respectively with respect to the included angle between the light-entering surface and the light-exiting surface as illustrated in FIG. 3D are some exemplary embodiments of the disclosure and are not used for limiting the disclosure. Persons with ordinary skill in the art can suitably modify the parameters or settings after reading the disclosure to cause changes of the set data, which is also within the scope of the disclosure.

Table 1 exemplarily lists the included angle $\theta_1$ between the light-entering surface and the light-exiting surface, the arrangement period P, the corresponding light receiving angle $\theta_2$ and the field angle $\varphi_2$ of the camera array apparatus 100, when having different refractive index, in the camera array apparatus 100 in some embodiments, e.g., the camera array apparatus 100 illustrated in FIG. 2B, where the field angle $\varphi_1$ of the camera 110 is set as 56 degrees. In other embodiments, the light receiving angle $\theta_2$ may also vary with different structural designs of the prism set 122, which is not limited in the disclosure.

TABLE 1

| | Refractive index n | | | | |
|---|---|---|---|---|---|
| | 1.4 | 1.5 | 1.5 | 1.5. | 1.7 |
| Included angle $\theta_1$ (°) | 20 | 11 | 15.5 | 20 | 20 |
| Period P (μm) | 200 | 200 | 200 | 200 | 200 |
| Light receiving angle $\theta_2$ (°) | 8.6 | 5.5 | 8 | 10.9 | 15.6 |
| Field angle $\varphi_2$ (°) | 73.2 | 67 | 72 | 77.8 | 87.2 |

Figure 4A:
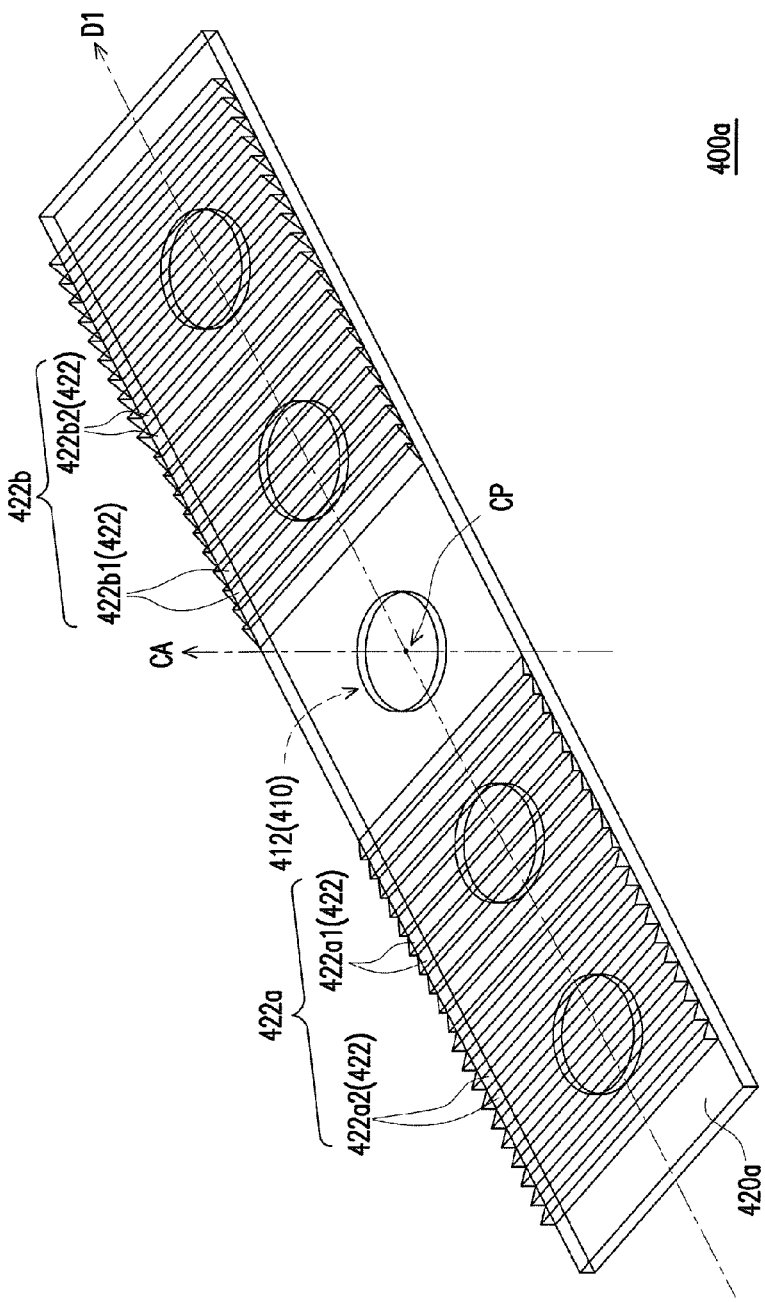
FIG. 4A is a schematic top-view diagram illustrating a camera array apparatus according to another embodiment of the disclosure.
Figure 4B:
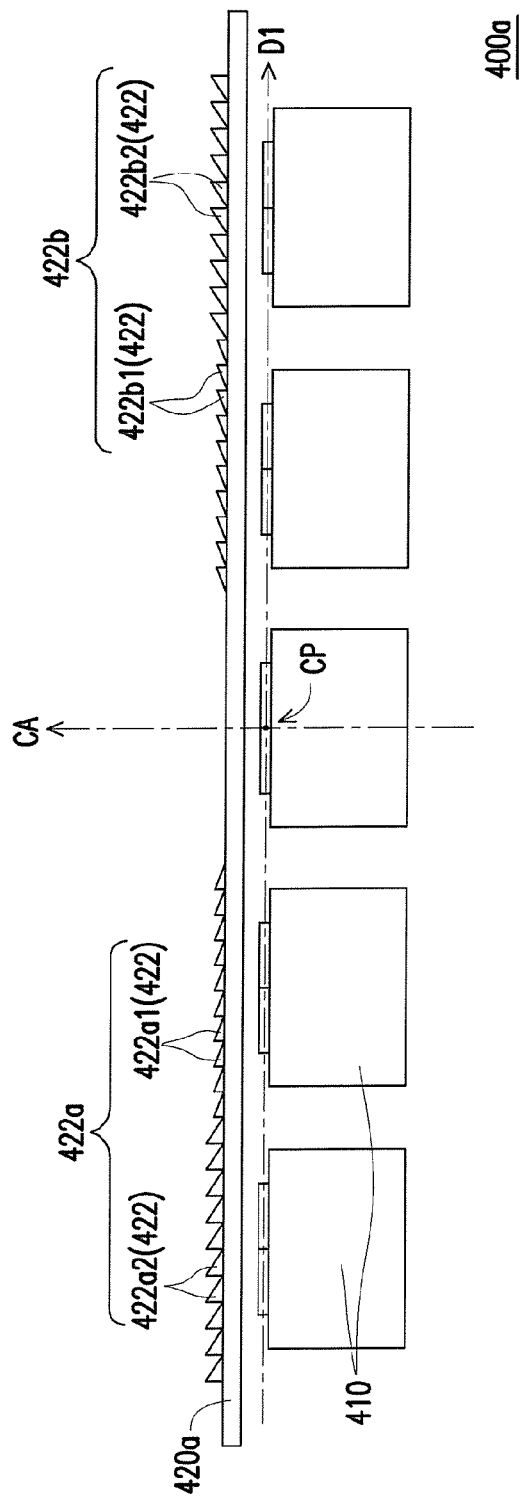
FIG. 4B is a schematic side-view diagram of the camera array apparatus of the embodiment illustrated in FIG. 4A.

FIG. 4A is a schematic top-view diagram illustrating a camera array apparatus according to another embodiment of the disclosure. FIG. 4B is a schematic side-view diagram of the camera array apparatus of the embodiment illustrated in FIG. 4A. Referring to FIG. 4A and FIG. 4B, in the present embodiment, a camera array apparatus 400a of the present embodiment illustrated in FIG. 4A is similar to the camera array apparatus 100 of the embodiment illustrated in FIG. 1A. Components and related description of the camera array apparatus 400a may refer to the camera array apparatus 100 of the embodiment illustrated in FIG. 1A and thus, will not be repeatedly described. The camera array apparatus 400a and the camera array apparatus 100 are different in the camera array apparatus 400a including five cameras 410 having apertures 412 which are arranged in an array along a first axis D1. A prism set 422 of a light deflection module 420a includes a plurality of first prisms 422a1 and 422a2 and a plurality of second prisms 422b1 and 422b2. In the present embodiment, one-dimensional array formed by the cameras 410 arranged in an extending direction of the first axis D1 has a center point CP, the prism set 422 does not cover a camera 410 located at the center point CP. Additionally, the first prisms 422a1 and 422a2 serve the central axis CA as a symmetry axis, and are line-symmetric to the second prisms 422b1 and 422b2. In the present embodiment, first prisms 422a include the first prisms 422a1 belonging to a first group and the first prisms 422a2 belonging to a second group, and second prisms 422b include the second prisms 422b1 belonging to the first group and the second prisms 422b2 belonging to the second group. Distances between the first prism 422a2 and the second prisms 422b2 belonging to the second group and the center point CP are greater than distances between the first prisms 422a1 and the second prisms 422b1 belonging to the first group and the center point CP. In the present embodiment, the included angle $\theta_1$ between the light-entering surface 132 and the light-exiting surface 134 of each of the first prisms 422a2 and the second prisms 422b2 belonging to the second group is greater than the included angle $\theta_1$ between the light-entering surface 132 and the light-exiting surface 134 of each of the first prisms 422a1 and the second prisms 422b1 belonging to the first group. To be specific, the light-entering surface 132 of each of the first prisms 422a2 and the second prisms 422b2 belonging to the second group has a greater oblique angle in comparison with the light-entering surface 132 of each of the first prisms 422a1 and the second prisms 422b1 belonging to the first group.

In the present embodiment, the prism sets 422 of the camera array apparatus 400*a* are configured to deflect the light entering obliquely with respect to an optical axis of the cameras 410 to part of the cameras 410. An included angle of the deflected light with respect to the optical axis of the cameras 410 is smaller than an included angle of the light before being deflected with respect to the optical axis of the cameras 410. Thus, a plurality of images captured the cameras 410 of the camera array apparatus 400*a* have fewer overlapping areas with one another, and thus, may form a stitched image having a greater field angle thorough image stitching, such that the camera array apparatus 400*a* achieves a wide viewing angle effect similar to that of the camera array apparatus 100 of the embodiment illustrated in FIG. 1A. Additionally, in the camera array apparatus 400*a*, since the light-entering surface 132 of each of the first prisms 422*a*2 and the second prisms 422*b*2 belonging to the second group has a greater oblique angle than the light-entering surface 132 of each of the first prisms 422*a*1 and second prisms 422*b*1 belonging to the first group, the first prisms 422*a*2 and the second prisms 422*b*2 belonging to the second group at least receive the light entering obliquely with respect to the optical axis at a greater included angle, such that the wide viewing angle effect of the camera array apparatus 400*a* may be even better.

Figure 4C:
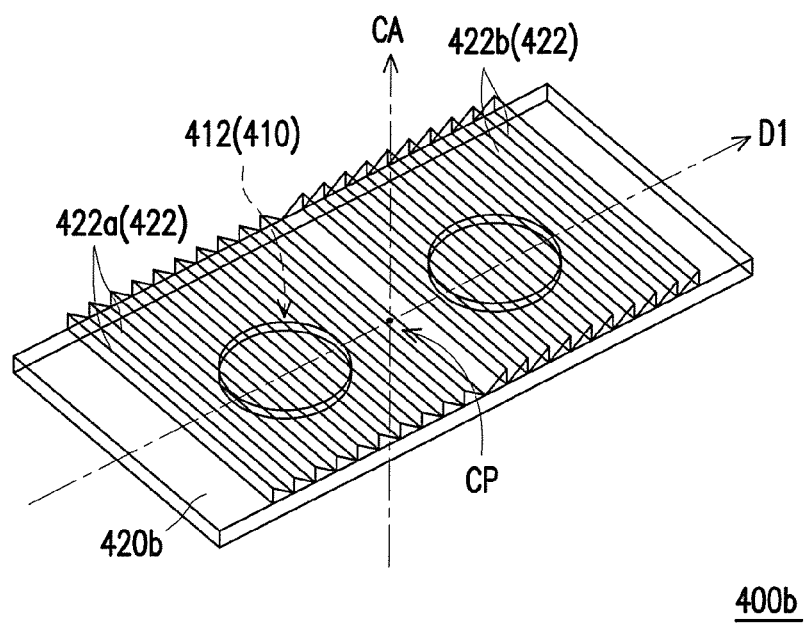
FIG. 4C is a schematic top-view diagram illustrating a camera array apparatus according to yet another embodiment of the disclosure.
Figure 4D:
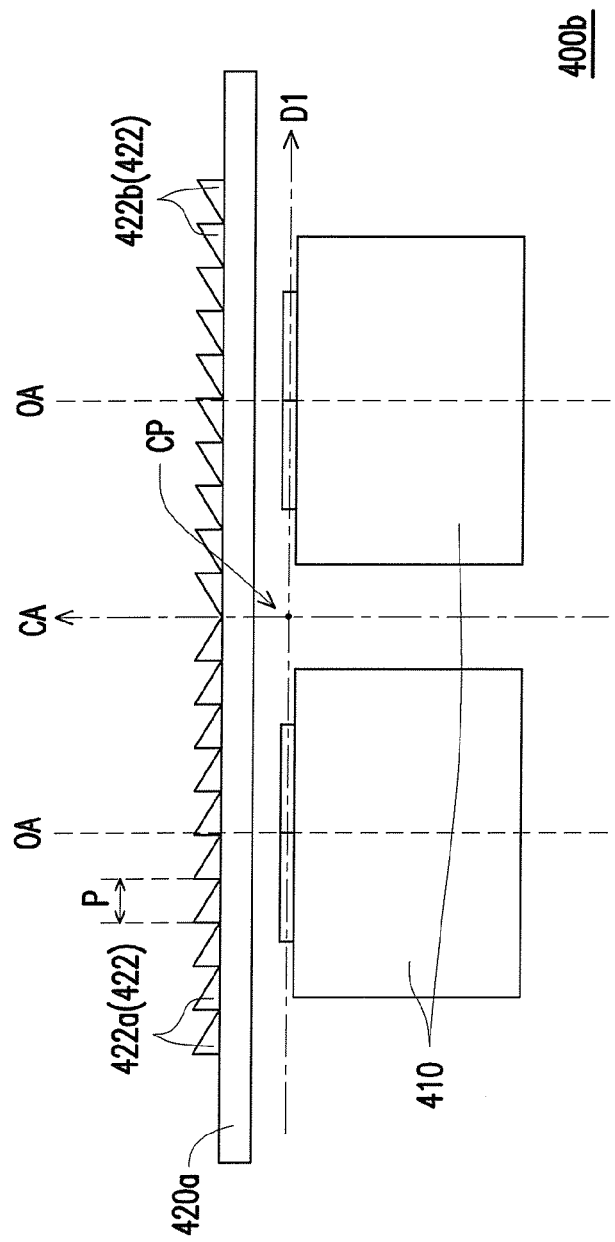
FIG. 4D is a schematic side-view diagram of the camera array apparatus of the embodiment illustrated in FIG. 4C.

FIG. 4C is a schematic top-view diagram illustrating a camera array apparatus according to yet another embodiment of the disclosure. FIG. 4D is a schematic side-view diagram of the camera array apparatus of the embodiment illustrated in FIG. 4C. Referring to FIGS. 4C and 4D, in the present embodiment, a camera array apparatus 400*b* of the present embodiment illustrated in FIG. 4C is similar to the camera array apparatus 100 of the embodiment illustrated in FIG. 1A. Components and related description of the camera array apparatus 400*b* may refer to the camera array apparatus 100 of the embodiment illustrated in FIG. 1A and thus, will not be repeatedly described. The camera array apparatus 400*b* and the camera array apparatus 100 are different in the camera array apparatus 400*b* including two cameras 410 having the apertures 412, and a prism set 422 of a light deflection module 420*b* including a plurality of first prisms 422*a* and a plurality of second prisms 422*b*. The first prisms 422*a* cover one of the cameras 410, and the second prisms 422*b* cover another camera 410. In the present embodiment, the first prisms 422*a* serve the central axis CA as the symmetry axis and are line-symmetric to the second prisms 422*b*. To be specific, an oblique degree of the light-entering surface 132 of each first prism 422*a* is equal to an oblique degree of the light-entering surface 132 of each second prism 422*b*.

In the present embodiment, the prism set 422 of the camera array apparatus 400*b* is configured to deflect the light entering obliquely with respect to the optical axis of the cameras 410 to part of the cameras 410. An included angle of the deflected light with respect to the optical axis of the cameras 410 is smaller than an included angle of the light before being deflected with respect to the optical axis of the cameras 410. Thus, the camera array apparatus 400*b* achieves a wide viewing angle effect similar to that of the camera array apparatus 100 of the embodiment illustrated in FIG. 1A.

Figure 4E:
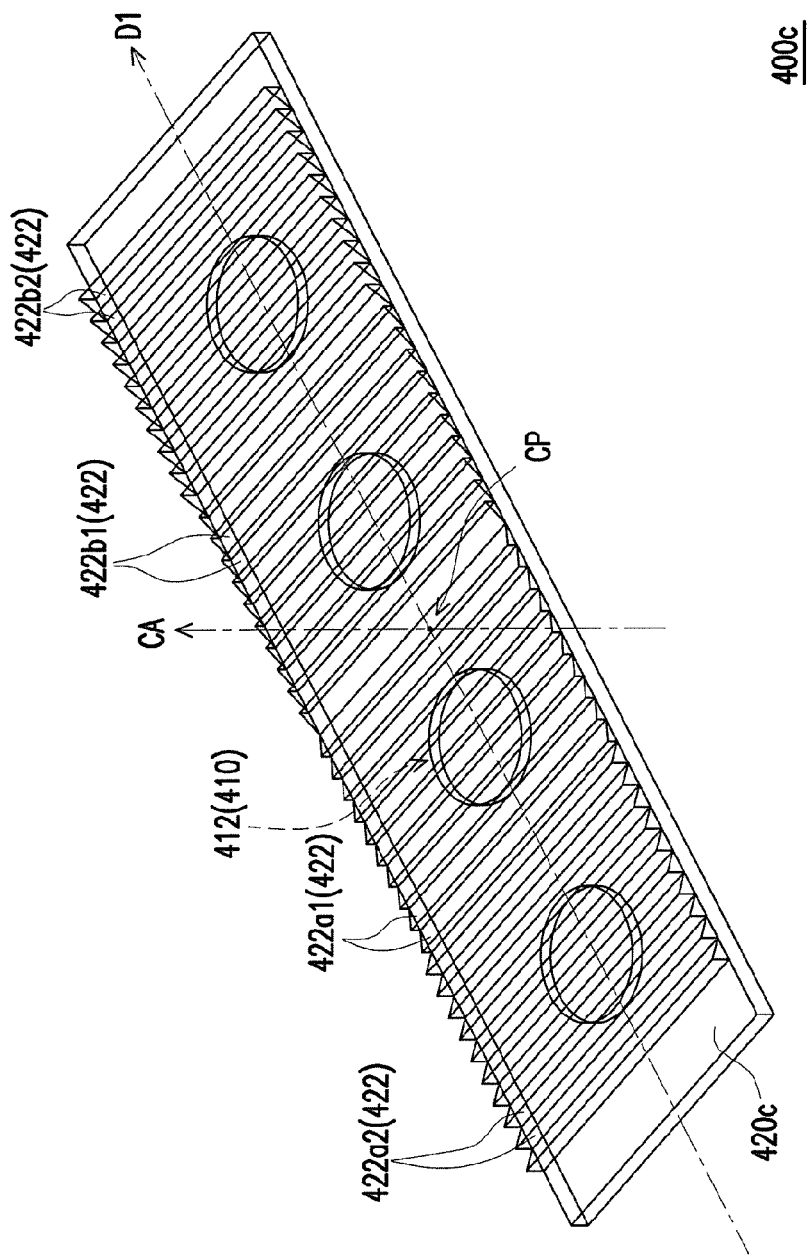
FIG. 4E is a schematic top-view diagram illustrating a camera array apparatus according to still another embodiment of the disclosure.
Figure 4F:
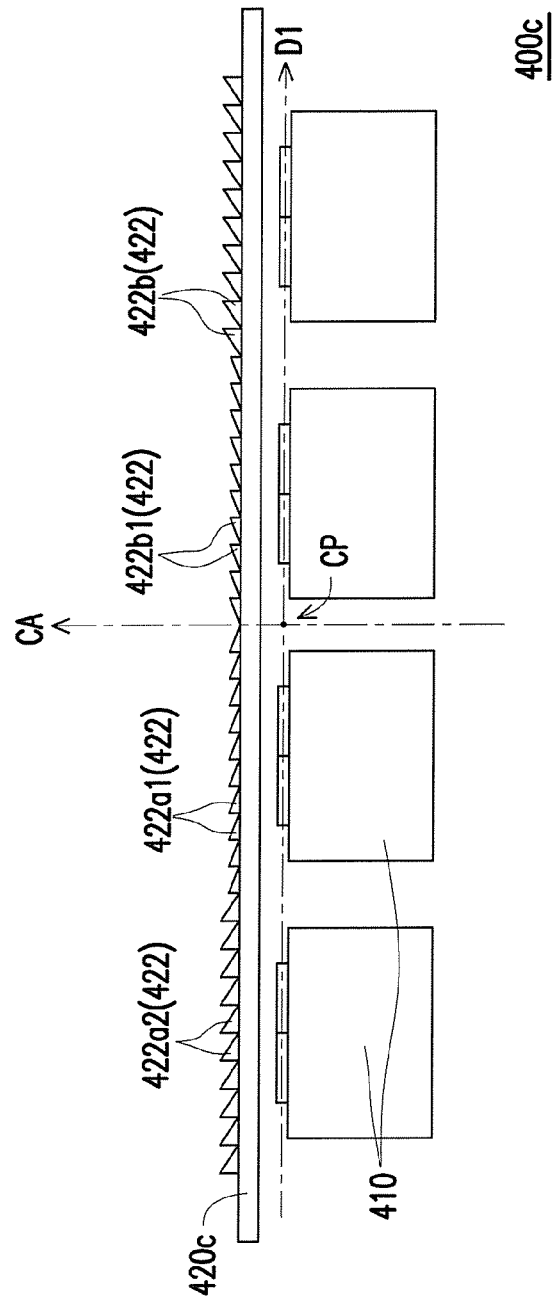
FIG. 4F is a schematic side-view diagram of the camera array apparatus of the embodiment illustrated in FIG. 4E.

FIG. 4E is a schematic top-view diagram illustrating a camera array apparatus according to still another embodiment of the disclosure. FIG. 4F is a schematic side-view diagram of the camera array apparatus of the embodiment illustrated in FIG. 4E. Referring to FIG. 4E and FIG. 4F. In the present embodiment, a camera array apparatus 400*c* of the present embodiment illustrated in FIG. 4E is similar to the camera array apparatus 400*a* illustrated in FIG. 4A. Components and related description of the camera array apparatus 400*c* may refer to the camera array apparatus 400*a* of the embodiment illustrated in FIG. 4A and thus, will not be repeatedly described. The camera array apparatus 400*c* and the camera array apparatus 400*a* are different in the camera array apparatus 400*c* including four cameras 410 having the apertures 412, and a prism set 422 of the light deflection module 420*c* including a plurality of first prisms 422*a*1 belonging to a first group, a plurality of first prisms 422*a*2 belonging to a second group, a plurality of second prisms 422*b*1 belonging to the first group and a plurality of second prisms 422*b*2 belonging to the second group. In the present embodiment, the prism set 422 respectively covers the cameras 410. Additionally, the light-entering surface 132 of each of first prisms 422*a*2 and the second prisms 422*b*2 belonging to the second group has a greater oblique angle than the light-entering surface 132 of each of the first prisms 422*a*1 and the second prisms 422*b*1 belonging to the first group. In the present embodiment, the camera array apparatus 400*c* also achieves a wide viewing angle effect similar to that of the camera array apparatus 400*a* of the embodiment illustrated in FIG. 4A.

Figure 4G:
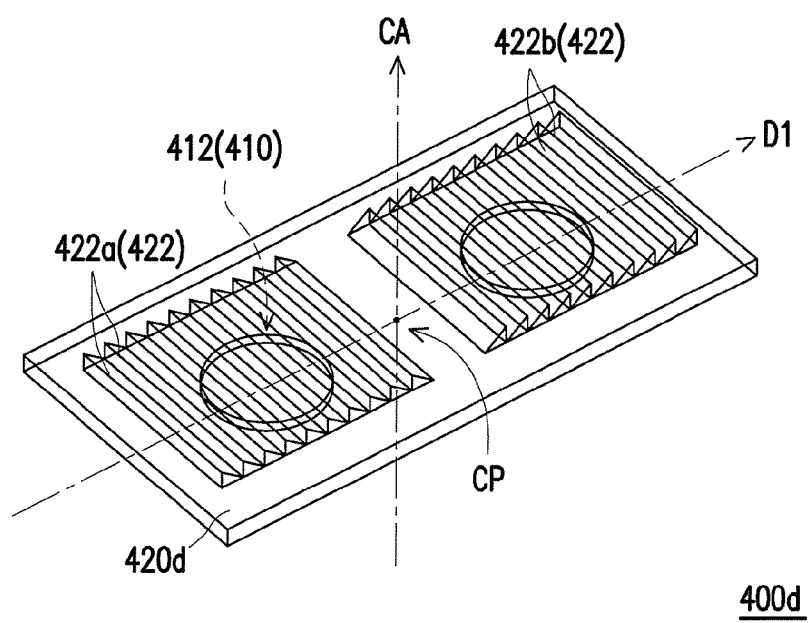
FIG. 4G is a schematic top-view diagram illustrating a camera array apparatus according to another embodiment of the disclosure.

FIG. 4G is a schematic top-view diagram illustrating a camera array apparatus according to another embodiment of the disclosure. Referring to FIG. 4G, in the present embodiment, a camera array apparatus 400*d* of the present embodiment illustrated in FIG. 4G is similar to the camera array apparatus 400*b* of the embodiment illustrated in FIG. 4C. Components and related description of the camera array apparatus 400*d* may refer to the camera array apparatus 400*b* of the embodiment illustrated in FIG. 4C and thus, will not be repeatedly described. The camera array apparatus 400*d* and the camera array apparatus 400*b* are different in a light deflection module 420*d* of the camera array apparatus 400*d* further including a prism set 422, wherein the prism set 422 includes a plurality of first prisms 422*a* and a plurality of second prisms 422*b*, the first prisms 422*a* are not connected with the second prisms 422*b*, and the first prisms 422*a* and the second prisms 422*b* are distributed in areas where the cameras 410 are disposed. In the present embodiment, the camera array apparatus 400*d* also achieves a wide viewing angle effect similar to that of the camera array apparatus 400*b* of the embodiment illustrated in FIG. 4C.

Figure 4H:
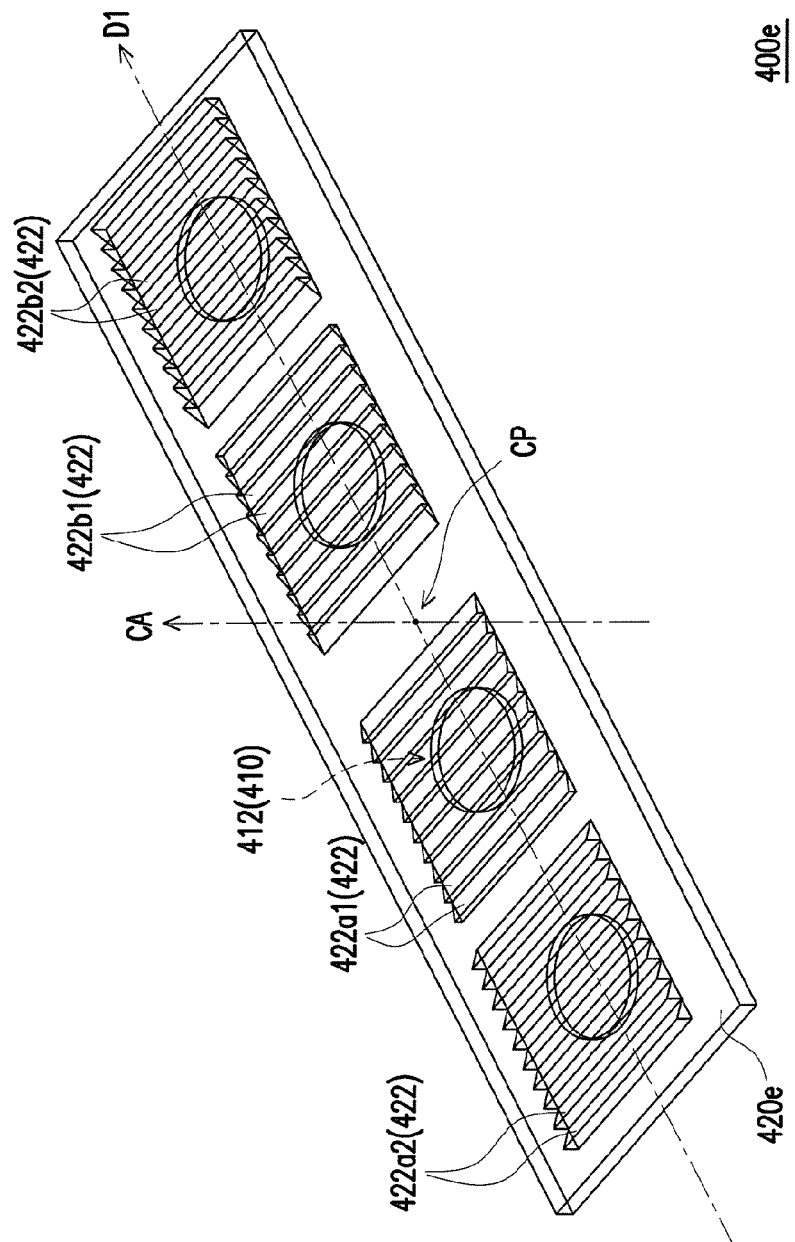
FIG. 4H is a schematic top-view diagram illustrating a camera array apparatus according to yet another embodiment of the disclosure.

FIG. 4H is a schematic top-view diagram illustrating a camera array apparatus according to yet another embodiment of the disclosure. Referring to FIG. 4H, in the present embodiment, a camera array apparatus 400*e* of the present embodiment illustrated in FIG. 4H is similar to the camera array apparatus 400*c* of the embodiment illustrated in FIG. 4E. Components and related description of the camera array apparatus 400*e* may refer to the camera array apparatus 400*c* of the embodiment illustrated in FIG. 4E and thus, will not be repeatedly described. The camera array apparatus 400*e* and the camera array apparatus 400*c* are different in a light deflection module 420*e* of the camera array apparatus 400*e* further including a prism set 422. To be specific, the prism set 422 includes a plurality of first prisms 422*a*1 belonging to a first group, a plurality of first prisms 422*a*2 belonging to a second group, a plurality of second prisms 422*b*1 belonging to the first group and a plurality of second prisms 422*b*2 belonging to the second group, the first prisms 422*a*1 and 422*a*2 are not connected with the second prisms 422*b*1 and 422*b*2, and the first prisms 422*a*1 and 422*a*2 and the second prisms 422*b*1 and 422*b*2 are distributed in areas where the cameras 410 are disposed. In the present embodiment, the camera array apparatus 400e also achieves a wide viewing angle effect similar to that of the camera array apparatus 400c of the embodiment illustrated in FIG. 4E. In detail, the areas where the first prisms 422a1 and 422a2 and the second prisms 422b1 and 422b2 are distributed cover the apertures 412 of the cameras 410, but are not limited to what have been describe above.

Figure 5A:
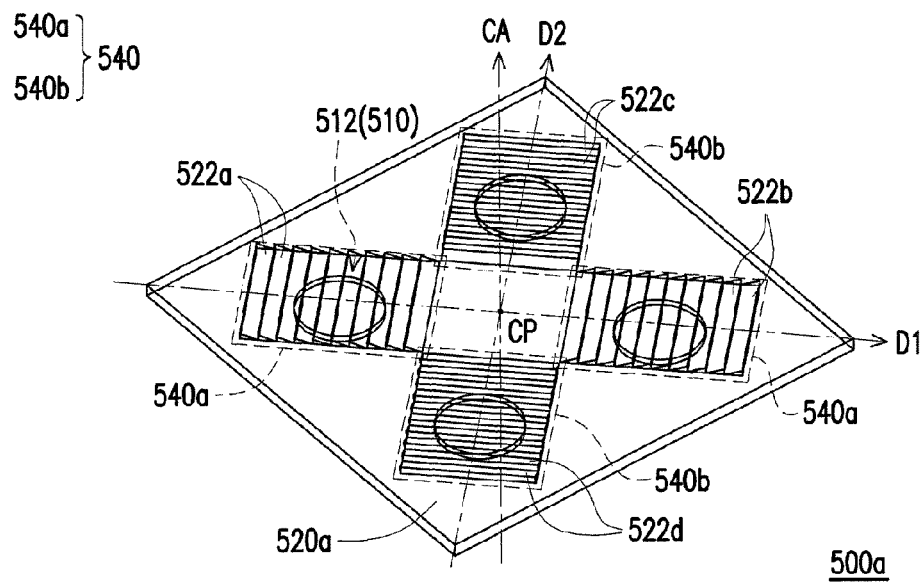
FIG. 5A is a schematic top-view diagram illustrating a camera array apparatus according to still another embodiment of the disclosure.

FIG. 5A is a schematic top-view diagram illustrating a camera array apparatus according to still another embodiment of the disclosure. Referring to FIG. 5A, in the present embodiment, a camera array apparatus 500a of the present embodiment illustrated in FIG. 5A is similar to the camera array apparatus 400d of the embodiment illustrated in FIG. 4G. Components and related description of the camera array apparatus 500a may refer to the camera array apparatus 400d of the embodiment illustrated in FIG. 4G and thus, will not be repeatedly described. The camera array apparatus 500a and the camera array apparatus 400d are different in the camera array apparatus 500a including four cameras 510 having apertures 512, and a light deflection module 520a having a plurality of prism sets 540, which include first prism sets 540a and second prism sets 540b. The first prism set 540a includes a plurality of first prisms 522a and a plurality of second prisms 522b, and the second prism set 540b also includes a plurality of first prisms 522c and a plurality of second prisms 522d. The prism sets 540 respectively cover the cameras 510. In the present embodiment, the cameras 510 are arranged in a two-dimensional array, and light-entering surfaces 132 of the first prisms 522a, the second prisms 522b, the first prisms 522c and the second prisms 522d obliquely face a center of the two-dimensional array CP. A central axis CA passes through a center point CP of the two-dimensional array and is perpendicular to a plane formed by the two-dimensional array. Each prism set 540 is arranged in a row along an axis, the axes intersect at the center point CP of the two-dimensional array, and the axes perpendicular to the central axis CA.

In the present embodiment, the first prisms 522a and the second prisms 522b of the first prism sets 540a are arranged in a row along a first axis D1, and the first prisms 522c and the second prisms 522d of the second prism sets 540b are arranged in a row along a second axis D2. The first axis D1 and the second axis D2 intersect at the center point CP, and the first axis D1, the second axis D2 and the central axis CA are perpendicular to one another. In the present embodiment, the first prisms 522a and the second prisms 522b of the first prism sets 540a are line-symmetric to each other with respect to the central axis CA, and the first prisms 522c and the second prisms 522d of the second prism sets 540b are line-symmetric to each other with respect to the central axis CA. In the present embodiment, the cameras 510 are arranged in a two-dimensional array, the light-entering surface 132 of each first prism 522a, the light-entering surface 132 of each second prism 522b, the light-entering surface 132 of each first prisms 522c and the light-entering surface 132 of each second prisms 522d obliquely face toward the center point CP of the two-dimensional array. Thus, besides achieving the wide viewing angle effect similar to that of the camera array apparatus 400d of the embodiment illustrated in FIG. 4G, the camera array apparatus 500a also achieves the wide viewing angle effect in the direction of the first axis D1 and the direction of the second axis D2 that are perpendicular to each other (i.e., in two-dimensional directions).

Figure 5B:
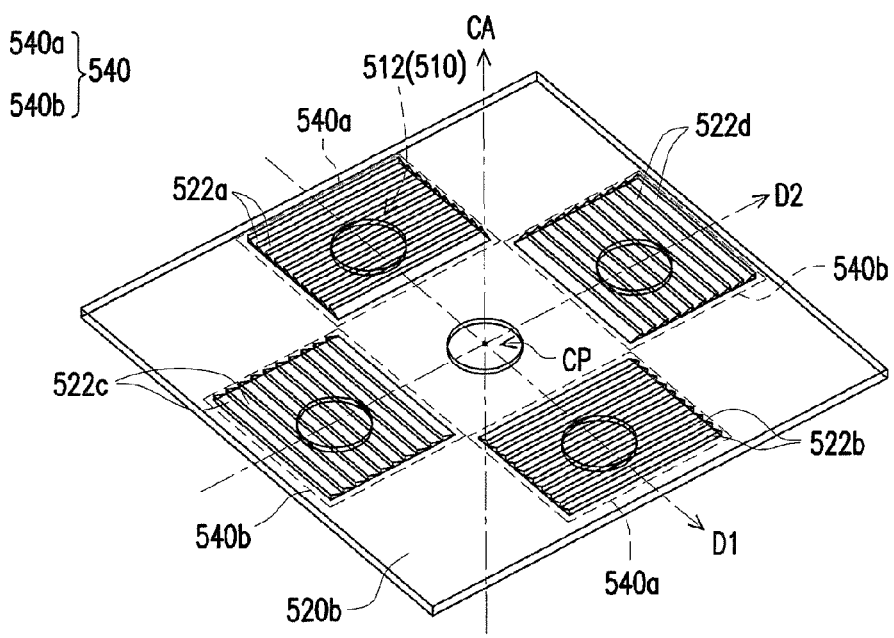
FIG. 5B is a schematic top-view diagram illustrating a camera array apparatus according to another embodiment of the disclosure.

FIG. 5B is a schematic top-view diagram illustrating a camera array apparatus according to another embodiment of the disclosure. Referring to FIG. 5B, in the present embodiment, a camera array apparatus 500b of the present embodiment illustrated in FIG. 5B is similar to the camera array apparatus 500a of the embodiment illustrated in FIG. 5A. Components and related description of the camera array apparatus 500b may refer to the camera array apparatus 500a of the embodiment illustrated in and thus, will not be repeatedly described. The camera array apparatus 500b and the camera array apparatus 500a are different in the camera array apparatus 500b including five cameras 510 having the apertures 512, where the prism set 540 does not cover one of the cameras 510 which is located at the center point CP. In the present embodiment, the camera array apparatus 500b also achieves wide viewing angle effect similar to that of the camera array apparatus 500a of the embodiment illustrated in FIG. 5A.

Figure 5C:
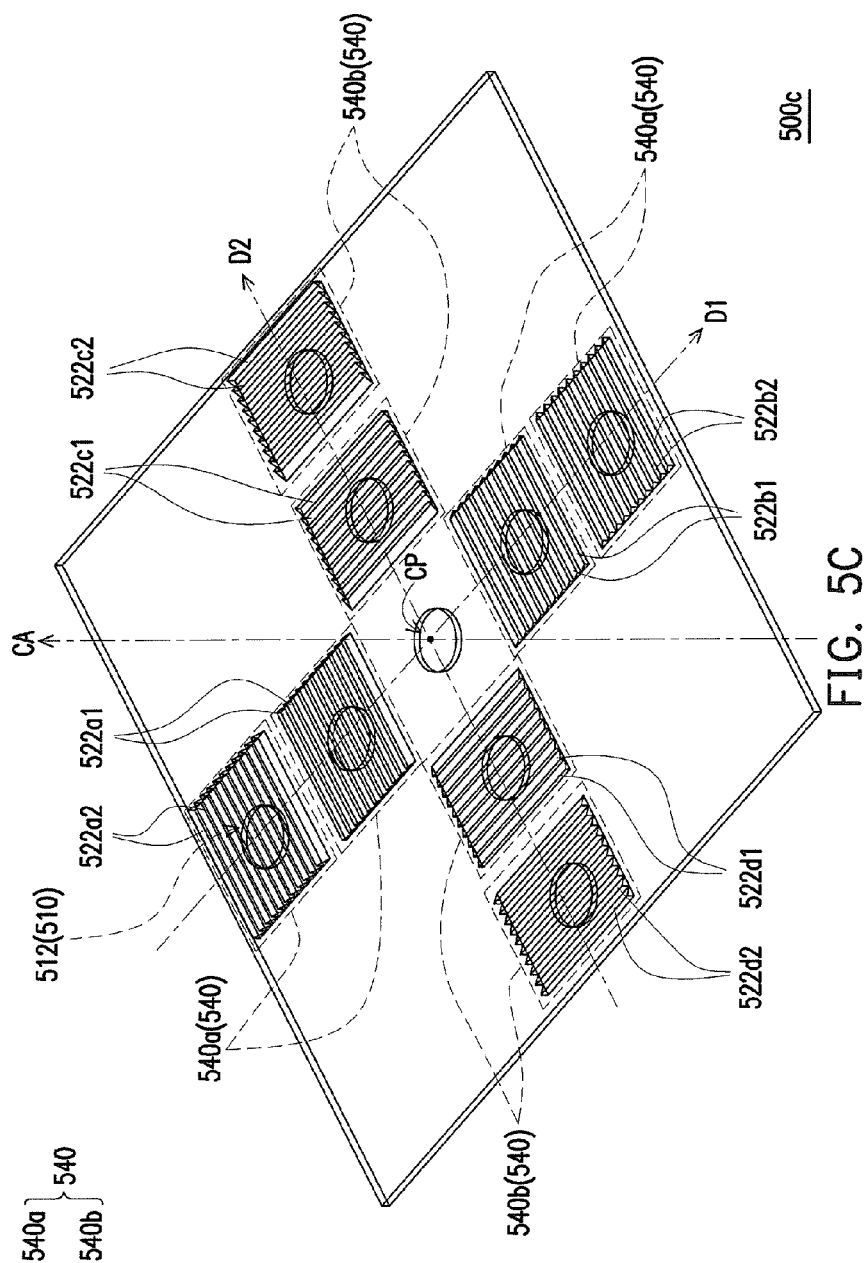
FIG. 5C is a schematic top-view diagram illustrating a camera array apparatus according to yet another embodiment of the disclosure.

FIG. 5C is a schematic top-view diagram illustrating a camera array apparatus according to yet another embodiment of the disclosure. Referring to FIG. 5C, in the present embodiment, a camera array apparatus 500c of the present embodiment illustrated in FIG. 5C is similar to the camera array apparatus 500b of the present embodiment illustrated in FIG. 5B. Components and related description of the camera array apparatus 500c may refer to the camera array apparatus 500b of the present embodiment illustrated in FIG. 5B and thus, will not be repeatedly described. The camera array apparatus 500c and the camera array apparatus 500b are different in the camera array apparatus 500c including nine cameras 510 having the apertures 512, where the cameras 510 are arranged to form a crisscross shape. A light deflection module 520c has a plurality of prism sets 540 including first prism sets 540a and second prism sets 540b. The first prism sets 540a include a plurality of first prisms 522a1 belonging to a first group, a plurality of first prisms 522a2 belonging to a second group, a plurality of second prisms 522b1 belonging to the first group and a plurality of second prisms 522b2 belonging to the second group. The second prism sets 540b include a plurality of first prisms 522c1 belonging to the first group, a plurality of first prisms 522c2 belonging to the second group, a plurality of second prisms 522d1 belonging to the first group and a plurality of second prisms 522d2 belonging to the second group. In the present embodiment, the first prisms 522a1, the first prisms 522a2, the second prisms 522b1, the second prisms 522b2 of the first prism sets 540a arranged along the first axis D1 are line-symmetric to one another with respect to the central axis CA, and the first prisms 522c1, the first prisms 522c2, the second prisms 522d1, the second prisms 522d2 of the second prism sets 540b along the second axis D2 are line-symmetric to one another with respect to the central axis CA. Additionally, in the first prism sets 540a and the second prism sets 540b, the light-entering surface 132 of each of the first prisms 522a2, the second prisms 522b2, the first prisms 522c2, the second prisms 522d2 belonging to the second group has a greater oblique angle than the light-entering surface 132 of each of the first prisms 522a1, the second prisms 522b1, the first prisms 522c1, the second prisms 522d1 belonging to the first group. In the present embodiment, the camera array apparatus 500c achieves a wide viewing angle effect similar to that of the camera array apparatus 500b of the embodiment illustrated in FIG. 5B.

Figure 5D:
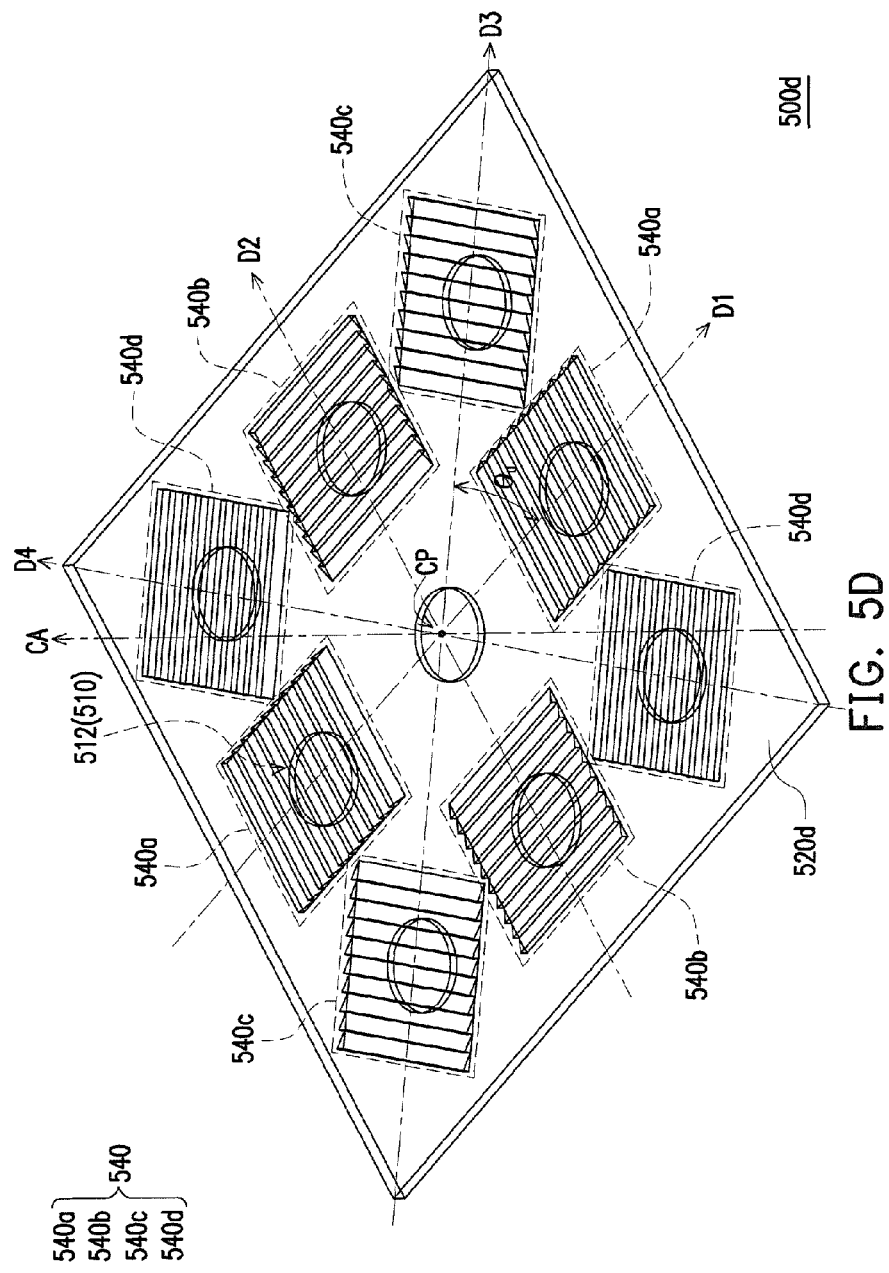
FIG. 5D is a schematic top-view diagram illustrating a camera array apparatus according to still another embodiment of the disclosure.

FIG. 5D is a schematic top-view diagram illustrating a camera array apparatus according to still another embodiment of the disclosure. Referring to FIG. 5D, in the present embodiment, a camera array apparatus 500d of the embodiment illustrated in FIG. 5D is similar to the camera array apparatus 500b of the present embodiment illustrated in FIG. 5B. Components and related description of the camera array apparatus 500d may refer to the camera array apparatus 500b of the present embodiment illustrated in FIG. 5B and thus, will not be repeatedly described. The camera array apparatus 500d and the camera array apparatus 500b are different in the camera array apparatus 500d including nine cameras 510 having the apertures 512, and the cameras 510 are arranged in a 3*3 array. A plurality of prism sets 540 of a light deflection module 520d include first prism sets 540a, second prism sets 540b, third prism sets 540c and fourth prism sets 540d. Each of the prism sets 540 includes a plurality of prisms. In the present embodiment, the prisms of the first prism sets 540a arranged along the first axis D1 are line-symmetric to each other with respect to the central axis CA, and the prisms of the second prism sets 540b arranged along the second axis D2 are line-symmetric to each other with respect to the central axis CA.

In the present embodiment, the prisms of the third prism sets 540c are arranged in a row along a third axis D3, and the prisms of the fourth prism sets 540d are arranged in a row along a fourth axis D4. The third axis D3 and the fourth axis D4 intersect at the center point CP, and the third axis D3, the fourth axis D4, and the central axis CA are perpendicular to one another. To be specific, an included angle between the first axis D1 and the third axis D3 is 45°. Additionally, the prisms of the third prism sets 540c arranged along the third axis D3 are line-symmetric with respect to the central axis CA, and the prisms of the fourth prism sets 540d arranged along the fourth axis D4 are line-symmetric with respect to the central axis CA. In the present embodiment, besides achieving the wide viewing angle effect similar to that of the camera array apparatus 500b of the embodiment illustrated in FIG. 5B, the camera array apparatus 500d also achieves the wide viewing angle effect in the direction of the third axis D3 and the direction of the fourth axis D4 that are perpendicular to each other.

Figure 5E:
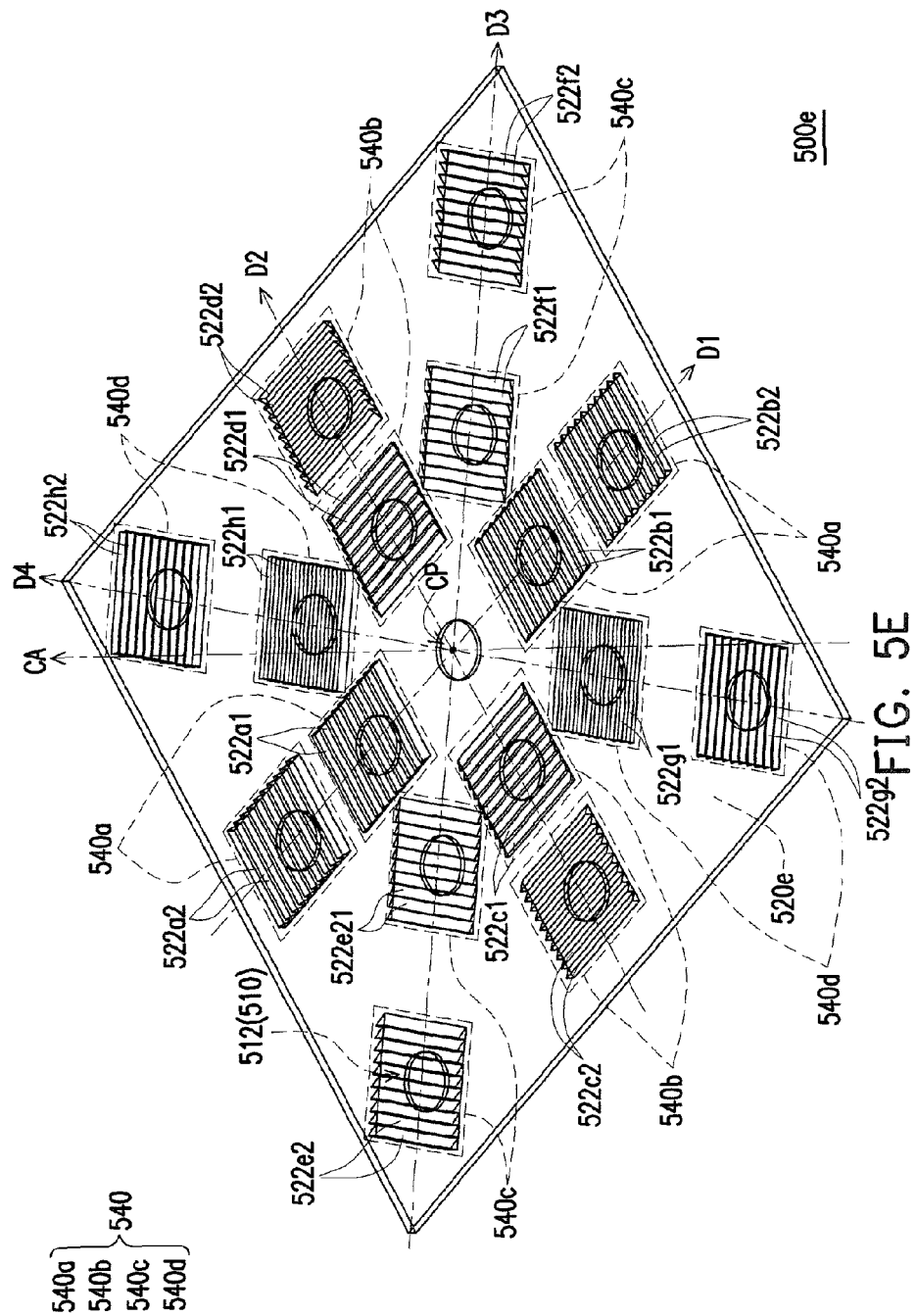
FIG. 5E is a schematic top-view diagram illustrating a camera array apparatus according to another embodiment of the disclosure.

FIG. 5E is a schematic top-view diagram illustrating a camera array apparatus according to another embodiment of the disclosure. Referring to FIG. 5E, in the present embodiment, a camera array apparatus 500e of the present embodiment illustrated in FIG. 5E is similar to the camera array apparatus 500d of the embodiment illustrated in FIG. 5D. Components and related description of the camera array apparatus 500e may refer to the camera array apparatus 500d of the embodiment illustrated in FIG. 5D and thus, will not be repeatedly described. The camera array apparatus 500e and the camera array apparatus 500d are different in the camera array apparatus 500e including seventeen cameras 510 having the apertures 512, where the cameras 510 are arranged in a 3*3 array, and a camera 510 is additionally arranged in each of the eight directions extending from the four axes (i.e., the first axis D1 to the fourth axis D4). A plurality of prism sets 540 of a light deflection module 520e include first prism sets 540a, second prism sets 540b, third prism sets 540c and fourth prism sets 540d. Each of the prism sets 540 includes a plurality of prisms. In the present embodiment, the first prism sets 540a include a plurality of first prisms 522a1, 522a2 and a plurality of second prisms 522b1, 522b2, and the second prism sets 540b include a plurality of first prisms 522c1, 522c2 and a plurality of second prisms 522d1, 522d2. The first prisms 522a1, the first prisms 522a2, the second prisms 522b1 and the second prisms 522b2 arranged along the first axis D1 are line-symmetric with respect to the central axis CA, and the first prisms 522c1, the first prisms 522c2, the second prisms 522d1 and the second prisms 522d2 arranged along the second axis D2 are line-symmetric with respect to the central axis CA.

In the present embodiment, the third prism sets 540c include a plurality of first prisms 522e1, 522e2 and a plurality of second prisms 522f1, 522f2, and the fourth prism sets 540d include a plurality of first prisms 522g1, 522g2 and a plurality of second prisms 522h1, 522h2. The third prism sets 540c are arranged in a row along the third axis D3, and the fourth prism sets 540d are arranged in a row along the fourth axis D4. The third axis D3 and the fourth axis D4 intersect at the center point CP, and the third axis D3, the fourth axis D4, and the central axis CA are perpendicular to one another. Additionally, in the present embodiment, the first prisms 522c1, 522e2 and the second prisms 522f1, 522f2 arranged along the third axis D3 are line-symmetric to each other with respect to the central axis CA, and the first prisms 540g1, 540g2 and the second prisms 522h1, 522h2 arranged along the fourth axis D4 are line-symmetric to each other with respect to the central axis CA. In the prism sets 540, those near to the central axis CA are the prisms, such as the first prisms 522a1, 522c1, 522e1, 522g1, and the second prisms 522b1, 522d1, 522f1, 522h1 belonging to a first group, and those away from the central axis CA are the prisms, such as the first prisms 522a2, 522c2, 522e2, 522g2 and the second prisms 522b2, 522d2, 522f2, 522h2 belonging to a second group. The light-entering surface 132 of each of the first prisms 522a2, 522c2, 522e2, 522g2 and the second prisms 522b2, 522d2, 522f2, 522h2 belonging to the second group has a greater oblique angle than the light-entering surface 132 of each of the first prisms 522a1, 522c1, 522e1, 522g1, and the second prisms 522b1, 522d1, 522f1, 522h1 belonging to the first group. In the present embodiment, besides achieving the wide viewing angle effect similar to that of the camera array apparatus 500b of the embodiment illustrated in FIG. 5B, the camera array apparatus 500e also achieves the wide viewing angle effect in the direction of the third axis D3 and the direction of the fourth axis D4 that are perpendicular to each other.

Figure 5F:
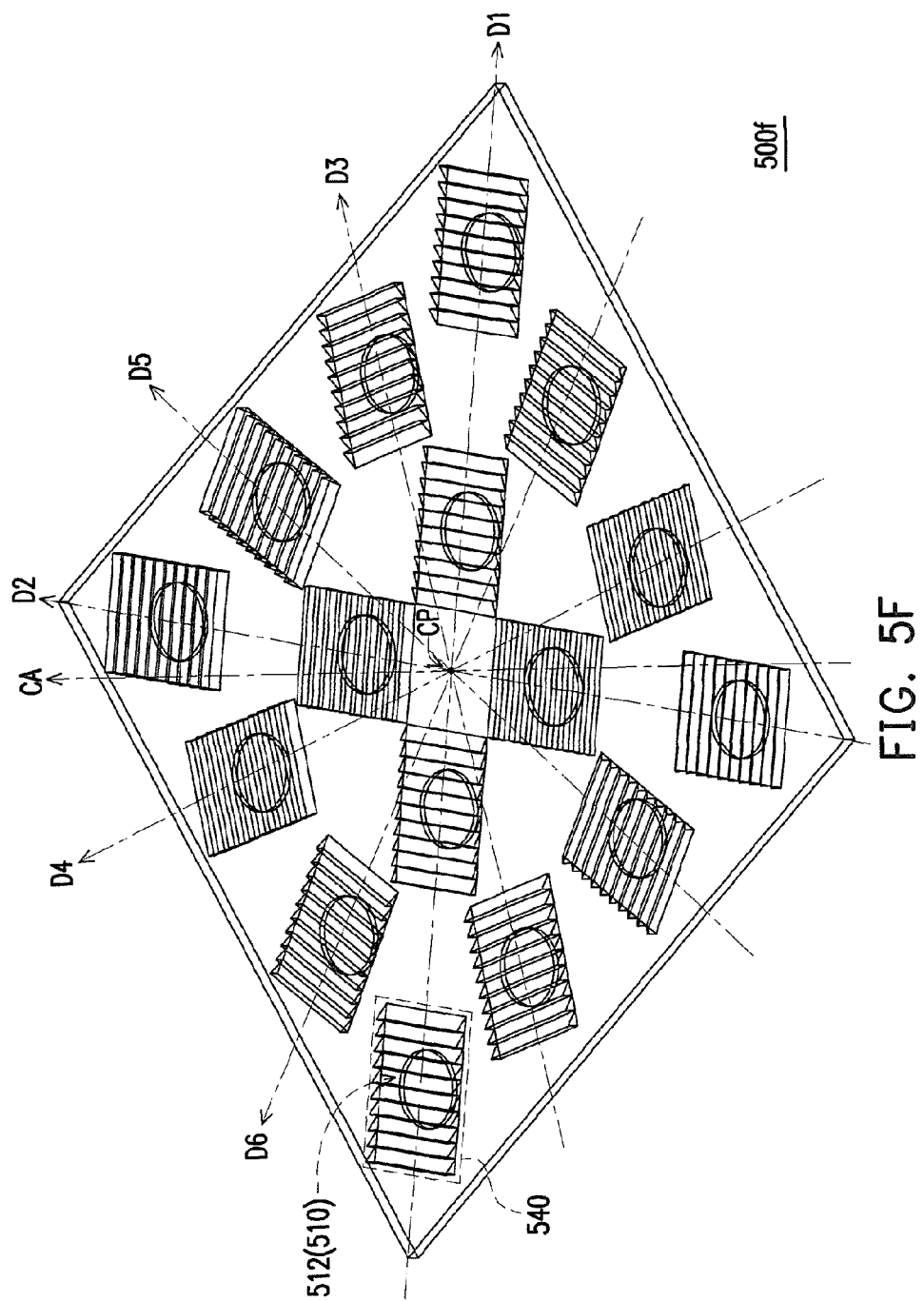
FIG. 5F is a schematic top-view diagram illustrating a camera array apparatus according to yet another embodiment of the disclosure.

FIG. 5F is a schematic top-view diagram illustrating a camera array apparatus according to yet another embodiment of the disclosure. In the present embodiment, a camera array apparatus 500f of the present embodiment illustrated in FIG. 5F is similar to the camera array apparatus 500a of the embodiment illustrated in FIG. 5A. Components and related description of the camera array apparatus 500f may refer to the camera array apparatus 500a of the embodiment illustrated in FIG. 5A and thus, will not be repeatedly described. The camera array apparatus 500f and the camera array apparatus 500a are different in the camera array apparatus 500f including sixteen cameras 510 having the apertures 512, where the cameras 510 are arranged in a 4*4 array. A plurality of prism sets 540 of a light deflection module 520f include first prism sets, second prism sets, third prism sets and fourth prism sets. The prisms of the first prism sets, second prism sets, third prism sets and the fourth prism sets are respectively arranged in rows along the first axis D1, the second axis D2, the third axis D3 and fourth axis D4. To be specific, the prisms of the prism sets respectively arranged along the first axis D1, the second axis D2, the third axis D3 and the fourth axis D4 are line-symmetric with respect to the central axis CA. The first axis D1 and the second axis D2 intersect at the center point CP, and the first axis D1, the second axis D2 and the central axis CA are perpendicular to one another. The third axis D3 and the fourth axis D4 intersect at the center point CP, and the third axis D3, the fourth axis D4 and the central axis CA are perpendicular to one another.

In the present embodiment, the prism sets 540 further includes fifth prism sets and sixth prism sets. Prisms of the fifth prism set and the sixth prism set are respectively arranged in rows along a fifth axis D5 and a sixth axis D6. The fifth axis D5 and the sixth axis D6 intersect at the center point CP, and the fifth axis D5, the sixth axis D6 and the central axis CA are perpendicular to one another. To be specific, the prism sets respectively arranged along the fifth axis D5 and the sixth axis D6 are line-symmetric with respect to the central axis CA. Additionally, an included angle between the light-entering surface and the light-exiting surface of each of the prisms belonging to the second group away from the center point CP is greater than an included angle between the light-entering surface and the light-exiting surface of each of the prisms belonging to the first group near the center point CP. In the present embodiment, besides achieving the wide viewing angle effect similar to that of the camera array apparatus 500a of the embodiment illustrated in FIG. 5A, the camera array apparatus 500f achieves the wide viewing angle effect in both the direction of the third axis D3 and the direction of the fourth axis D4 that are perpendicular to each other, as well as in both the direction of the fifth axis D5 and in the direction of the sixth axis D6 that are perpendicular to each other.

Figure 5G:
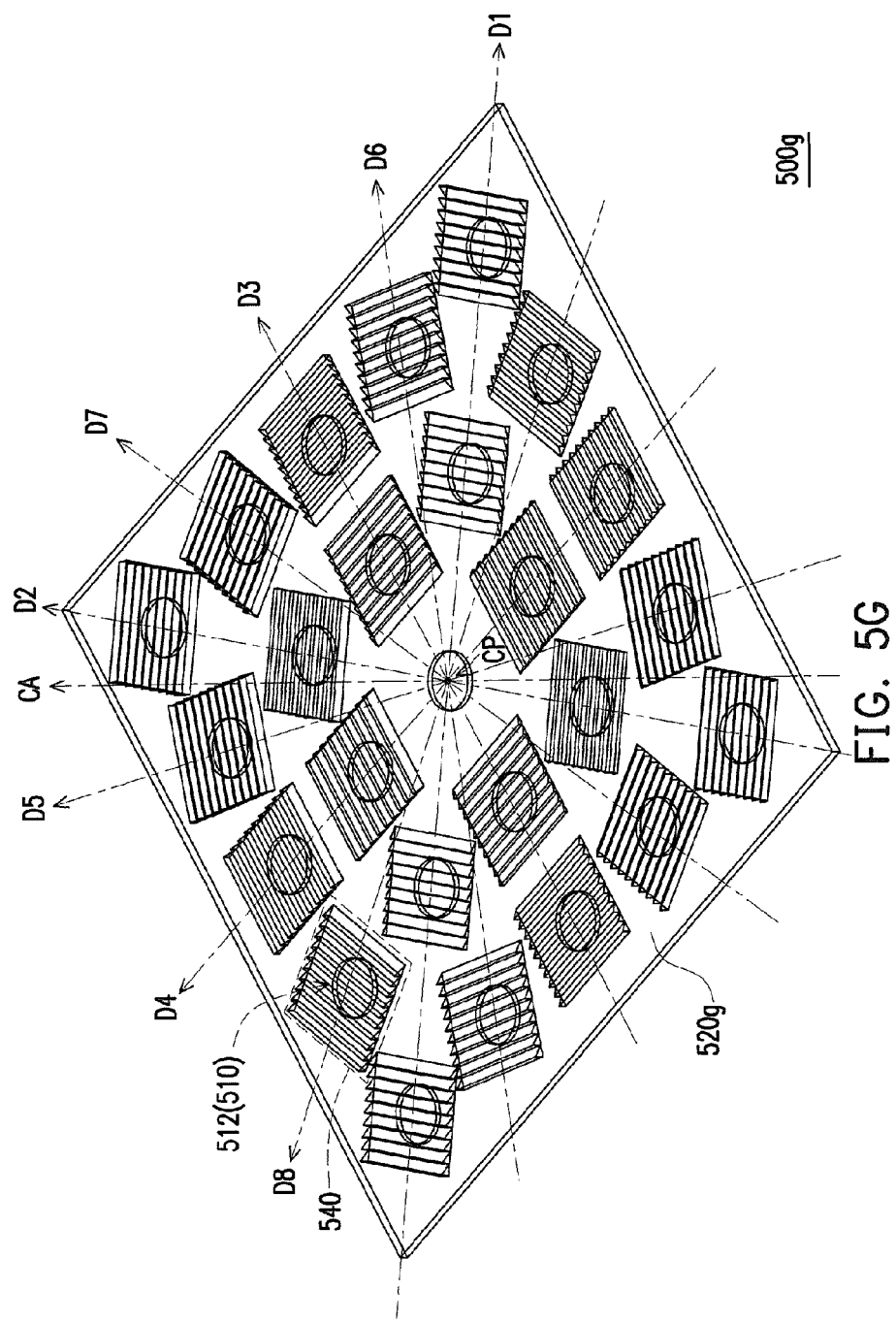
FIG. 5G is a schematic top-view diagram illustrating a camera array apparatus according to still another embodiment of the disclosure.

FIG. 5G is a schematic top-view diagram illustrating a camera array apparatus according to still another embodiment of the disclosure. Referring to FIG. 5G, in the present embodiment, a camera array apparatus 500g of the present embodiment illustrated in FIG. 5G is similar to the camera array apparatus 500f of the embodiment illustrated in FIG. 5F. Components and related description of the camera array apparatus 500g may refer to the camera array apparatus 500f of the embodiment illustrated in FIG. 5F and thus, will not be repeatedly described. The camera array apparatus 500g and the camera array apparatus 500f are different in the camera array apparatus 500g includes twenty-five cameras 510 having the apertures 512, where the cameras 510 are arranged in a 5*5 array. A plurality of prism set 540 of a light deflection module 520g further include seventh prism sets and eighth prism sets. Prisms of the seventh prism sets and the eighth prism sets are respectively arranged in rows along a seventh axis D7 and an eighth axis D8. To be specific, in the present embodiment, the prisms of the seventh prism sets and the eighth prism sets respectively arranged along the seventh axis D7 and the eighth axis D8 are line-symmetric with respect to the central axis CA. The seventh axis D7 and the eighth axis D8 intersect at the center point CP, and the seventh axis D7, the eighth axis D8 and the central axis CA are perpendicular to one another. In the present embodiment, besides achieving the wide viewing angle effect similar to that of camera array apparatus 500f of the embodiment illustrated in FIG. 5F, the camera array apparatus 500g also achieves the wide viewing angle effect in both the direction of the seventh axis D7 and the direction of the eighth axis D8 that are perpendicular to each other.

To summarize, in the camera array apparatus introduced in the embodiments of the disclosure, with the light deflection module including at least one prism set having the plurality of prisms, the light entering obliquely with respect to the optical axis of the cameras is deflected to at least a portion of the cameras. The included angle of the deflected light with respect to the optical axis is smaller than the included angle of the light before being deflected with respect to the optical axis. Thus, the images captured by the cameras have fewer overlapping areas with one another, so as to form the stitched image having a larger field angle by means of image stitching.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A camera array apparatus, comprising:
a plurality of cameras, arranged in an array; and
a light deflection module, disposed on the cameras, the light deflection module comprising at least one prism set having a plurality of prisms, the prism set being configured to deflect a light entering obliquely with respect to an optical axis of the cameras to at least a portion of the cameras, wherein an included angle of the deflected light with respect to the optical axis is smaller than an included angle between the light before being deflected and the optical axis,
wherein the prisms are periodically arranged, and an arrangement period of the prisms is more than 50 times a wavelength value corresponding to a spectral peak of the light, and the arrangement period of the prisms is less than 1 mm.

2. The camera array apparatus according to claim 1, further comprising a processing unit configured to perform image stitching on a plurality of images captured by the cameras to form a stitched image.

3. The camera array apparatus according to claim 1, wherein the arrangement period of the prisms is more than 27.5 μm.

4. The camera array apparatus according to claim 1, wherein a refractive index of the prisms falls within a range from 1.4 to 1.7.

5. The camera array apparatus according to claim 1, wherein each of the prisms has a light-entering surface, a light-exiting surface and a side surface connected together, the light enters the prisms through the light-entering surfaces of the prisms, exits the prisms through the light-exiting surfaces of the prisms and enters at least a portion of the cameras.

6. The camera array apparatus according to claim 5, wherein the array is a one-dimensional array, and the light-entering surface of each of the prisms obliquely faces a center of the one-dimensional array.

7. The camera array apparatus according to claim 6, wherein the prism set comprises a plurality of first prisms and a plurality of second prisms, a central axis passes through the center of the one-dimensional array and is perpendicular to an arrangement direction of one-dimensional array, the first prisms and the second prisms are respectively disposed at two different sides of the central axis, and the first prisms and the second prisms are line-symmetric to each other with respect to the central axis.

8. The camera array apparatus according to claim 6, wherein the prisms comprise a first group and a second group, distances between the prisms belonging to the second group and the center of the one-dimensional array are greater than distances between the prisms belonging to the first group and the center of the one-dimensional array, and an included angle between the light-entering surface and the light-exiting surface of each of the prisms belonging to the second group is greater than an included angle between the light-entering surface and the light-exiting surface of each of the prisms belonging to the first group.

9. The camera array apparatus according to claim 5, wherein the array is a two-dimensional array, and the light-entering surface of each of the prisms obliquely faces a center of the two-dimensional array.

10. The camera array apparatus according to claim 9, wherein the light deflection module comprises a plurality of prism sets, each of the prism sets comprises a plurality of first prisms and a plurality of second prisms, a central axis passes through the center of the two-dimensional array and is perpendicular to a plane formed by the two-dimensional array, each of the prism sets is arranged in a row along an axis, the axes intersect at the center of the two-dimensional array, the axes are perpendicular to the central axis, the first prisms and the second prisms are respectively disposed at two different sides of the central axis, the first prisms and the second prisms of each of the prism sets are line-symmetric to each other with respect to the central axis.

11. The camera array apparatus according to claim 9, wherein a central axis passes through the center of the two-dimensional array and is perpendicular to a plane formed by the two-dimensional array, the light deflection module comprises a plurality of prism sets, each of the prism sets comprises a plurality of first prisms and a plurality of second prisms, the first prisms and the second prisms are respectively disposed at two different sides of the central axis, the prism sets comprises a first prism set and a second prism set, the first prisms and the second prisms of the first prism set are arranged in a row along a first axis, the first prisms and the second prisms of the second prism set are arranged in a row along a second axis, the first axis and the second axis intersect at the center of the two-dimensional array, and the first axis, the second axis and the central axis are perpendicular to one another, wherein the first prisms and the second prisms of the first prism set are line-symmetric to each other with respect to the central axis, and the first prisms and the second prisms of the second prism set are line-symmetric to each other with respect to the central axis.

12. The camera array apparatus according to claim 11, wherein the prism sets further comprise a third prism set and a fourth prism set, the first prisms and the second prisms of the third prism set are arranged in a row along a third axis, the first prisms and the second prisms of the fourth prism set are arranged in a row along a fourth axis, the third axis and the fourth axis intersect at the center of the two-dimensional array, and the third axis, the fourth axis and the central axis are perpendicular to one another, wherein the first prisms and the second prisms of the third prism set are line-symmetric to each other with respect to the central axis, and the first prisms and the second prisms of the fourth prism set are line-symmetric to each other with respect to the central axis.

13. The camera array apparatus according to claim 12, wherein an included angle between the first axis and the third axis is 45 degrees.

14. The camera array apparatus according to claim 12, wherein the prism sets further comprise a fifth prism set and a sixth prism set, the first prisms and the second prisms of the fifth prism set are arranged in a row along a fifth axis, the first prisms and the second prisms of the sixth prism set are arranged in a row along a sixth axis, the fifth axis and the sixth axis intersect at the center of the two-dimensional array, and the fifth axis, the sixth axis and the central axis are perpendicular to one another, wherein the first prisms and the second prisms of the fifth prism set are line-symmetric to each other with respect to the central axis, and the first prisms and the second prisms of the sixth prism set are line-symmetric to each other with respect to the central axis.

15. The camera array apparatus according to claim 14, wherein the prism sets further comprise a seventh prism set and an eighth prism set, the first prisms and the second prisms of the seventh prism are arranged in a row along a seventh axis, the first prisms and the second prisms of the eighth prism set are arranged in a row along a eighth axis, the seventh axis and the eighth axis intersect at the center of the two-dimensional array, and the seventh axis, the eighth axis and the central axis are perpendicular to one another, wherein the first prisms and the second prisms of the seventh prism set are line-symmetric to each other with respect to the central axis, and the first prisms and the second prisms of the eighth prism set are line-symmetric to each other with respect to the central axis.

16. The camera array apparatus according to claim 9, wherein the prisms comprise a first group and a second group, distances between the prisms belonging to the second group and the center of the two-dimensional array are greater than distances between the prisms belonging to the first group and the center of the two-dimensional array, wherein and included angle between the light-entering surface and the light-exiting surface of each of the prisms belonging to the second group is greater than an included angle between the light-entering surface and the light-exiting surface of each of the prisms belonging to the first group.

17. The camera array apparatus according to claim 5, wherein an included angle between the light-exiting surface and the side surface of each of the prisms falls within a range from 88 degrees to 90 degrees.

18. The camera array apparatus according to claim 1, wherein the cameras are wafer level cameras.

* * * * *